US011578645B2

(12) United States Patent
Daniels et al.

(10) Patent No.: US 11,578,645 B2
(45) Date of Patent: Feb. 14, 2023

(54) VALVE SYSTEM

(71) Applicant: Cummins Ltd, London (GB)

(72) Inventors: Robin Daniels, Huddersfield (GB);
Thomas Morton, Huddersfield (GB);
Thomas Roberts, Huddersfield (GB);
Christopher Parry, Huddersfield (GB);
Richard Goodyear, Huddersfield (GB);
Mark R. Holden, Huddersfield (GB);
Donald E. Willey, Huddersfield (GB)

(73) Assignee: CUMMINS LTD., Huddersfield (GB)

( * ) Notice: Subject to any disclaimer, the term of this patent is extended or adjusted under 35 U.S.C. 154(b) by 0 days.

(21) Appl. No.: 17/684,175

(22) Filed: Mar. 1, 2022

(65) Prior Publication Data

US 2022/0186661 A1   Jun. 16, 2022

Related U.S. Application Data

(63) Continuation of application No. 16/640,966, filed as application No. PCT/GB2018/052384 on Aug. 22, 2018, now abandoned.

(30) Foreign Application Priority Data

Aug. 22, 2017  (GB) .................................... 1713461

(51) Int. Cl.
*F02B 37/18* (2006.01)
*F01N 3/20* (2006.01)
(Continued)

(52) U.S. Cl.
CPC ................ *F02B 37/18* (2013.01); *F01N 3/20* (2013.01); *F02D 9/06* (2013.01); *F02D 41/12* (2013.01);
(Continued)

(58) Field of Classification Search
CPC ...... F01N 3/20; F01N 3/2006; F01N 2470/16; F02B 37/18; F02B 37/183; F02D 9/06;
(Continued)

(56) References Cited

U.S. PATENT DOCUMENTS 3,484,078 A   12/1969   Haenky
4,224,794 A   9/1980   Woollenweber
(Continued)

FOREIGN PATENT DOCUMENTS

CN      102072011 A      5/2011
DE   102011107413 A1    1/2013
(Continued)

OTHER PUBLICATIONS

International Preliminary Report on Patentability received for PCT Patent Application No. PCT/GB2018/052384, dated Mar. 5, 2020, 12 pages.
(Continued)

*Primary Examiner* — Audrey B. Walter
*Assistant Examiner* — Dapinder Singh
(74) *Attorney, Agent, or Firm* — Faegre Drinker Biddle & Reath

(57) ABSTRACT

A valve system comprising a valve chamber at a junction of an inlet port, an outlet port and a bypass port, the inlet port configured for fluid communication with exhaust gas, the outlet port configured for fluid communication with an inlet of a turbine, and the bypass port configured for fluid communication with an exhaust aftertreatment device; a rotary valve comprising a valve rotor which rotates about a valve axis within the valve chamber between a first position to permit gas flow through the bypass port and a second position to block gas flow. At least one of the valve rotor and the valve chamber comprises a protrusion and the other comprises a recess, wherein, in the first position, the pro-
(Continued)

trusion and recess are spaced from one another, and, in the second position the recess receives the protrusion such that gas flow between the protrusion and recess is substantially prevented.

11 Claims, 10 Drawing Sheets

(51) Int. Cl.
    *F02D 9/06*     (2006.01)
    *F02D 41/12*     (2006.01)
    *F16K 5/18*     (2006.01)
    *F16K 5/20*     (2006.01)
    *F16K 11/085*     (2006.01)

(52) U.S. Cl.
    CPC .................. *F16K 5/18* (2013.01); *F16K 5/20* (2013.01); *F16K 11/085* (2013.01)

(58) Field of Classification Search
    CPC ...... F02D 9/16; F02D 41/0007; F02D 41/024; F02D 41/12; F16K 5/18; F16K 5/20; F16K 11/0525; F16K 11/085; F16K 11/0853; Y02T 10/12
    See application file for complete search history.

(56) References Cited

U.S. PATENT DOCUMENTS

| | | | |
|---|---|---|---|
| 7,347,048 | B2 | 3/2008 | Albat |
| 8,276,613 | B2 * | 10/2012 | Park ...................... F16K 15/026 137/516.25 |
| 2005/0086936 | A1 | 4/2005 | Bucknell et al. |
| 2005/0144945 | A1 | 7/2005 | Schmid |
| 2009/0211245 | A1 | 8/2009 | McEwan |
| 2011/0123315 | A1 * | 5/2011 | Robinson .............. F02B 37/013 415/1 |
| 2014/0144134 | A1 | 5/2014 | McEwan et al. |
| 2016/0169167 | A1 | 6/2016 | Kuenzel |
| 2017/0138317 | A1 | 5/2017 | Gokhale |
| 2020/0173347 | A1 | 6/2020 | Daniels et al. |

FOREIGN PATENT DOCUMENTS

| | | |
|---|---|---|
| DE | 102012110873 A1 | 5/2014 |
| EP | 2333389 A1 | 6/2011 |
| FR | 2483515 A1 | 12/1981 |
| GB | 1533023 A | 11/1978 |
| GB | 2271167 A | 4/1994 |
| WO | 2009/030914 A2 | 3/2009 |
| WO | 2016/126237 A1 | 8/2016 |

OTHER PUBLICATIONS

International Search Report and Written Opinion received for PCT Patent Application No. PCT/GB2018/052384, dated Jan. 11, 2019, 17 pages.
Machine Translation DE 10 2011 107 413 (Year: 2021).
Partial ISR and Provisional Opinion issued by the European Patent Office , dated Jun. 11, 2018, for International Application No. PCT/GB2018/052384;16 pages.
Search report issued by the United Kingdom Intellectual Property Office, dated Jan. 30, 2018, for British Application No. GB1713461. 0; 4 pages.

* cited by examiner

VALVE SYSTEM

CROSS-REFERENCE TO RELATED APPLICATIONS

The present application is a continuation of U.S. patent application Ser. No. 16/640,966 filed on Feb. 21, 2020, which claims the benefit of the National Stage Application under 35 U.S.C. § 371 of PCT Application No. PCT/GB2018/052384, filed Aug. 22, 2018, which claims priority to U.K. Application No. 1713461.0, filed Aug. 22, 2017, the entire disclosures of which being hereby expressly incorporated herein by reference.

FIELD OF THE DISCLOSURE

The present disclosure relates to a valve system. In particular, the present disclosure relates to a turbine bypass valve suitable for bypassing the inlet to a turbine. The valve may be for an engine arrangement. The engine arrangement may form part of a vehicle. The disclosure also relates to modifications to said valve system to reduce leakage across a valve which forms part of the valve system.

BACKGROUND

Turbines are well known devices for converting the kinetic energy within a flowing gas into useful work. In particular, known turbines convert the kinetic energy of flowing gas into rotation of the turbine. The rotation of the turbine may be transmitted by a suitable linkage to any device suitable for doing useful work. Examples of such devices include a power generator (such that the turbine forms part of a power turbine) and a compressor (such that the device is a turbocharger).

As is well known in the art, turbochargers include a turbine and a compressor, and function by the turbine receiving exhaust gasses from an internal combustion engine and consequently rotating a turbine wheel of the turbine so as to drive rotation of a compressor wheel of the compressor. The compressor wheel draws in gas and pressurises it so that the gas at an outlet of the compressor is at an elevated pressure (or boost pressure) as compared to that at the inlet of the compressor. The output of the compressor of the turbocharger (i.e. the gas at boost pressure) can be fed to an inlet of the internal combustion engine of which the turbocharger forms part. The increased pressure of the gas supplied to the inlet of the engine may lead to increased power output of the engine.

In some applications of turbine, a valve system may be required to enable exhaust gas produced by the engine to which the turbine is attached to bypass the turbine so it flows to the exhaust after treatment device or system without passing through the turbine.

Known valve systems (e.g. turbine bypass valves or rotary valves) can be difficult to manufacture to the required tolerances and therefore expensive. Furthermore, it can be complicated to integrate a valve system into the portion of the engine concerned.

There exists a need to provide an alternative valve system which overcomes one or more of the disadvantages of known valve systems whether set out above or not. Additionally, there is a need for an alternative valve system.

SUMMARY

According to a first aspect of the disclosure there is provided valve system for an engine arrangement, the valve system comprising: a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; a rotary valve comprising a valve rotor which rotates about a valve axis within the valve chamber: wherein the valve rotor is rotatable about the valve axis between a first position in which the valve rotor permits gas flow through the bypass port and a second position in which the valve rotor blocks gas flow through the bypass port; and wherein at least one of the valve rotor and the valve chamber comprises a protrusion and the other of the valve rotor and the valve chamber comprises a corresponding recess, wherein, in the first position, the protrusion and recess are spaced from one another, and, in the second position the recess receives the protrusion such that gas flow between the protrusion and recess is substantially prevented.

The engine arrangement may form part of an automotive vehicle such as an automobile. More specifically, the vehicle may be a car, truck, bus, train or the like. The engine arrangement may be an internal combustion engine. The turbine may form part of a turbocharger or a power turbine.

The valve chamber may be generally cylindrical. The valve chamber may be a blind bore.

The inlet port, bypass port and outlet port may be arranged in any appropriate relative orientation. One such example, when viewed in axial cross-section (i.e. cross-section perpendicular to the axis of rotation of the rotary valve), the outlet port is generally opposite the inlet port and the bypass port is disposed between the inlet port and the outlet port. The bypass port may be closer to the inlet port than the outlet port. The bypass port may be substantially next to the inlet port.

The inlet port, bypass port and outlet port may have any appropriate geometry. For example, the ports may be generally circular, generally elliptical, generally rectangular or some other polygonal shape. The ports may not all have the same geometry and/or dimensions.

The inlet port, bypass port and outlet port may be directly connected to their respective regions/components of the engine arrangement with which they are in fluid communication. Alternatively, other components or connections may be present between the ports and the regions/components of the engine arrangement with which they are in fluid communication. For example, other components or connections may be interposed the engine of the vehicle and the inlet port.

The flow of gas exhaust gas from the engine may comprise all of the exhaust gas from the engine or a portion thereof.

The turbine may be a dual-inlet or twin-volute turbine. Alternatively, the turbine may be a single-inlet turbine. The turbine may be a variable geometry turbine.

The exhaust aftertreatment device may comprise one or more of a selective catalytic reduction (SCR) catalyst, diesel particulate filter (DPF) or other particulate filter, Diesel Oxidation catalyst. Lean NOx catalyst, NOx adsorber, or any other appropriate exhaust aftertreatment technology. The exhaust aftertreatment device may perform more efficiently at a higher temperature than room temperature. The exhaust aftertreatment device may have an activation or operating temperature which it must reach before the device functions to an acceptable efficiency.

The valve rotor may be generally cylindrical. The valve rotor may have a cavity for the passage of exhaust gas flow.

The valve rotor may be manufactured from metal. The rotary valve may incorporate a spindle about which the valve rotor rotates. A first end of the spindle may be received in a corresponding bore in the valve chamber. A bush may be seated in the bore such that the spindle is received in the bush and is thus able to rotate in the bush. A second end of the spindle may be received in a second bush. An actuator may be used to control the rotational position of the valve rotor and hence the state of the rotary valve. One of the spindles may be mechanically linked to (or in rotational communication with) the actuator. In particular, one of the spindles may be directly connected to the actuator.

The valve rotor may completely block exhaust gas flow through the bypass port when in the bypass port blocking position. Alternatively, the valve rotor may substantially block exhaust gas flow through the bypass port when in the bypass port blocking position. If the valve rotor is able to rotate to a position whereby the first outlet is substantially blocked, some leakage through the first outlet may be allowable. Alternatively, in some embodiments, the valve rotor may be able to rotate to a position whereby the first outlet is completely blocked.

The valve rotor may incorporate other sealing features to reduce leakage of exhaust gas flow through the bypass port when in the bypass port blocking position.

The valve rotor being able to block exhaust gas flow through the bypass port is advantageous because exhaust gas flow can be selectively diverted to the exhaust aftertreatment device. The exhaust gas flow through the bypass port can be used to increase the temperature of the exhaust aftertreatment device. Where the exhaust aftertreatment device increases in efficiency of operation with increasing temperature, exhaust gas flow through the bypass port can be used to increase the efficiency of operation of the exhaust aftertreatment device. When the exhaust gas flow is not required to increase the temperature of the exhaust aftertreatment device, the valve rotor can block the bypass port such that substantially all of the exhaust gas flow passes through the outlet port. In this case, substantially all of the exhaust gas flow passes to the inlet of the turbine, thereby increasing the operating output of the turbine and so the efficiency of engine arrangement.

The protrusion may be any feature which extends outwardly (e.g. generally radially outwardly relative to the axis of rotation of the valve rotor) from the valve rotor or inwardly (e.g. generally radially inwardly relative to the axis of rotation of the valve rotor) from the valve chamber. The protrusion may be of the form of an arm.

Where the protrusion is part of the valve rotor, the term protrusion is not intended to refer to a spindle (which enables rotation of the valve) which may extend from the valve rotor as part of the rotary valve.

The protrusion may span at least part of an axial length of the valve rotor. Alternatively, the protrusion may span an entire axial length of the valve rotor. By entire axial length, what may be meant is the axial length of the valve rotor excluding any spindle(s), if present.

In one form, the protrusion may be a generally rectangular protrusion from the valve rotor. The recess may be a stepped portion of the valve chamber.

The recess may have a corresponding geometry to that of the protrusion to enable the recess to receive the protrusion. For example, at least a portion of the protrusion may substantially tessellate with, or fit into, at least a portion of the recess when the rotary valve is in the bypass port blocking position. A clearance may exist between the recess, or a portion thereof, and the protrusion, or a portion thereof, in practice. The fitting or tessellating nature of the protrusion and recess may improve the sealing of the bypass port when the valve rotor is in the bypass port blocking position and thereby increase the system efficiency.

There may be contact between the protrusion and the recess. However, contact is not an absolute requirement. Even without contact, the combination of the protrusion and the recess will increase the effectiveness of the seal (for example by a labyrinthine path).

The protrusion and/or recess may be compliant in order to accommodate machining tolerances and/or thermal expansion within the valve system in use.

The protrusion may be integrally formed with the valve rotor. That is to say, the protrusion and valve rotor may be formed from a single body. Alternatively, the protrusion may be added to the valve rotor in a subsequent manufacturing step by a joining method such as, for example, brazing, welding, bolting or riveting.

The protrusion and recess combination may be used to define a backstop position for the rotary valve. That is to say, the protrusion may be received in the recess when the valve rotor is at the rotational position which marks the maximum rotational travel of the valve rotor in a particular direction (for example in an closing direction towards the second or closed position in which the bypass port is blocked). This may be beneficial for reasons of preventing excessive rotational travel of the valve rotor, which could otherwise lead to damage to components of the valve.

Incorporation of the protrusion and recess combination according to the present disclosure is also beneficial because manufacturing tolerances of the valve rotor and valve chamber can be relaxed without compromising the effectiveness of the seal and so efficiency of the system. There are associated cost and time savings in view of reducing manufacturing tolerances. With the protrusion providing the sealing function, the need for apex tip seals at a periphery of the valve rotor as used in a Wankel rotary engine is also negated. Wankel-style tip seals are intended to mean low tolerance regions or features at the periphery of the rotor, the tip seals providing the sealing between the valve rotor and the valve chamber.

At least one of the valve rotor and the valve chamber may comprise two protrusions and the other of the valve rotor and the valve chamber may comprise two recesses, each of the recesses being configured to receive a corresponding one of the protrusions when the valve rotor is in the second position such that gas flow between each corresponding protrusion and recess is substantially prevented.

The incorporation of two protrusions and two recesses is advantageous for reasons of simplified manufacture and alignment of the valve rotor in the valve chamber. Furthermore, incorporating two protrusions and two recesses is beneficial for reasons of a more balanced mass distribution of the rotary valve about the valve axis. In addition, incorporating two protrusions and corresponding recesses means that one corresponding protrusion and recess pair can be located either side of the bypass port, thereby ensuring that the valve rotor makes an effective seal around the bypass port when the valve rotor is in the second position.

The valve rotor may comprise the two protrusions and the valve chamber may comprise the two recesses.

The valve rotor comprising the two protrusions is advantageous because the protrusions are more easily incorporated in the valve rotor than the recess, for reasons of manufacturing.

The two protrusions of the valve rotor may be arranged in the same plane such that, in axial cross-section, the protrusions are extensions of a linear part of a segment of the valve rotor.

In other words the protrusions may be said to be extensions of a chord of the circular cross-section of the valve rotor. Arranging the two protrusions in the same plane is beneficial for reasons of alignment and manufacturing.

The two protrusions of the valve rotor may be located diametrically opposite one another.

The or each protrusion may incorporate a radius on a recess-facing edge.

Put another way, in the second position, when the or each recess receives the corresponding protrusion, a surface of the protrusion contacts a wall that defines the recess. Said surface of the protrusion (and the portion of the wall contacted by the surface of the protrusion) may include a radiused portion.

Incorporation of a radius on the recess-facing edge (or surface of the protrusion) is advantageous because the recess can be machined by, for example, a mill. As such, the recess can be machined from standard tooling. The radius is also beneficial because sharp corners are stress-raising features which can lead to premature failure of components by, for example, cyclic thermal fatigue.

The or each recess may incorporate a corresponding radius on a protrusion-facing edge.

Put another way, in the second position, when the or each recess receives the corresponding protrusion, a surface of the wall that defines the recess which is contacted by the protrusion may include a radiused portion.

The corresponding radius on the protrusion-facing edge of the recesses (or surface of the wall that defines the recess) is beneficial for reasons of improved sealing. The radius is also beneficial because sharp corners are stress-raising features which can lead to premature failure of components by, for example, cyclic thermal fatigue.

According to a second aspect of the disclosure there is provided a valve system for an engine arrangement, the valve system comprising: a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; a rotary valve comprising a valve rotor which rotates about a valve axis within the valve chamber; wherein the valve rotor is rotatable about the valve axis between a first position in which the valve rotor permits gas flow through the bypass port and a second position in which the valve rotor blocks gas flow through the bypass port; and wherein the bypass port is generally trapezoidal and has a major dimension in the axial direction.

The engine arrangement may form part of an automotive vehicle such as an automobile. More specifically, the vehicle may be a car or a truck. The engine arrangement may be an internal combustion engine. The turbine may form part of a turbocharger or a power turbine.

Generally trapezoidal means a shape generally has four sides and which has a single pair of parallel sides. The bypass port may be generally rectangular. Generally rectangular is intended to mean a shape which has two pairs of two generally parallel sides. For example, a standard rectangle or a rectangle incorporating filleted internal corners may be used. Incorporating fillets on the internal corners of the rectangle may be beneficial for reasons of simpler manufacturing.

Major dimension is intended to mean a longer side of the generally trapezoidal geometry. For example, for a trapezoid having side lengths a 100 mm, 80 mm, 75 mm, and 60 mm, the 100 mm dimension is the major dimension. Whereas, for a rectangle which is 100 mm long by 50 mm wide, the 100 mm dimension is the major dimension.

Incorporating a generally trapezoidal bypass port with a major dimension in the axial direction is beneficial for reasons of reduced valve rotor rotation. That is to say, due to the elongate nature of the bypass port in the axial direction, as compared to a bypass port where this is not the case, less rotation of the valve rotor is required to move the valve rotor from a position whereby the bypass port is fully blocked to a position whereby the bypass port is fully open. Furthermore, less rotation of the valve rotor is required to move the valve rotor from a position whereby the bypass port is fully blocked to a position whereby the bypass port is open to the extent that the bypass port has a particular effective cross-sectional area. By effective cross-sectional area, what is meant is the cross-sectional area of the bypass port as modified by valve rotor at an interface between the bypass port and the valve rotor. Reducing valve rotor rotation is advantageous for reasons of reduced wear on both the valve rotor and the valve chamber. Furthermore, where an actuator is incorporated to rotate the rotary valve, a reduction in the required valve rotor rotation means that the valve rotor, and so rotary valve, need not rotate as often or as far. The actuator can therefore be reduced in size, power, mass and cost.

The aspect ratio of the bypass port may be between around 5:1 and around 20:1. The aspect ratio may be between about 1.5:1 and around 10:1.

The aspect ratio is intended to mean, for a trapezoid, the ratio of the major dimension to the width of the trapezoid perpendicular to the major dimension; and for a rectangle, the ratio of the width of the rectangle to the height of the rectangle (as viewed from a plane through the axis).

According to a third aspect of the present disclosure there is provided a valve system for an engine arrangement, the valve system comprising: a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; a valve comprising a valve member which moves within the valve chamber: wherein the valve member is movable between a first position in which exhaust gas is permitted to flow through the bypass port and a second position in which exhaust gas is substantially blocked from flowing through the bypass port; and wherein a cross-sectional area of the bypass port is smaller than a cross-sectional area of the inlet port.

The engine arrangement may form part of an automotive vehicle such as an automobile. More specifically, the vehicle may be a car or a truck. The engine arrangement may be an internal combustion engine. The turbine may form part of a turbocharger or a power turbine.

The valve may be a rotary valve comprising a valve rotor which rotates about a valve axis within the valve chamber. The valve rotor may be rotatable about the valve axis between the first and second positions.

The cross-sectional area of the bypass port being smaller than the cross-sectional area of the inlet port is advantageous because the bypass port represents a throat in the flow path. That is to say, the smaller cross-sectional area bypass port creates a pressure drop across the bypass port. This has the effect that more pumping work needs to be done in order to continue to force exhaust gas through the bypass port, when the valve rotor is not in the bypass port blocking position.

Increasing the pumping work can lead to a penalty in fuel efficiency, which makes such an arrangement counterintuitive. However, increasing the pumping work can also lead to an increase in the temperature of the exhaust gas. When the valve rotor is not in the bypass port blocking position, the exhaust gas is directed via the bypass port and to the exhaust aftertreatment device. An increase in exhaust gas temperature can therefore be beneficial because, where the exhaust aftertreatment device requires heat to be activated (i.e. heat is required to reach an operating temperature), the exhaust aftertreatment device can reach a required activation/operating temperature more quickly. The cross-sectional area of the bypass port being smaller than the cross-sectional area of the inlet port is therefore advantageous because it can be used to reduce the amount of time required for the exhaust aftertreatment device to reach a required activation/operating temperature.

The cross-sectional area of the bypass port may be smaller because the bypass port itself is of a smaller cross-sectional area. Alternatively, a constriction may be incorporated in the bypass port so as to reduce the cross-sectional area available to the exhaust gas flow path. The constriction may be, for example, a plate located in the bypass port. Where the plate is utilised, an annulus between an inner edge of the bypass port and an outer edge of the plate may be available for exhaust gas to flow through. The plate is just one example of a suitable embodiment of the constriction. Other suitable alternatives will be appreciated by the skilled person.

The ratio of the cross-sectional area of the bypass port to the cross-sectional area of the inlet port may be between around 1:2 and 1:20. The ratio may be between about 1:1.2 to 1:10. The ratio may be between about 1:1.2 to 1:20. The ratio may be between around 1:5 and 1:10.

According to a fourth aspect of the present disclosure, there is provided a valve system for an engine arrangement, the valve system comprising: a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; a valve comprising a valve member which moves within the valve chamber; wherein the valve member is movable between a first position in which exhaust gas is permitted to flow through the bypass port and a second position in which exhaust gas is substantially blocked from flowing through the bypass port; and wherein the bypass port is positioned relative to the inlet port such that an angle between the inlet port and the bypass port is acute. In other embodiments the angle between the inlet port and the bypass port may be obtuse.

The engine arrangement may form part of an automotive vehicle such as an automobile. More specifically, the vehicle may be a car or a truck. The engine arrangement may be an internal combustion engine. The turbine may form part of a turbocharger or a power turbine.

The valve may be a rotary valve comprising a valve rotor which rotates about a valve axis within the valve chamber. The valve rotor may be rotatable about the valve axis between the first and second positions.

The advantages provided by the inlet port being positioned at an acute angle relative to the bypass port are generally similar to those explained above for the cross-sectional area of the bypass port being smaller than the cross-sectional area of the inlet port. Positioning the bypass port at an acute angle relative to the inlet port creates a pressure drop across the bypass port. This in turn means that increased pumping work is required to continue to force exhaust gas through the bypass port when the valve rotor is not in the bypass port blocking position. This leads to an increase in the exhaust gas temperature which means that the exhaust aftertreatment device can reach an activation temperature more quickly.

The angle between the inlet port and the bypass port may be between around 50 and 80°. The angle between the inlet port and the bypass port may be between around 10° and 45°. The angle between the inlet port and the bypass port may be around 25°.

According to a fifth aspect of the disclosure there is provided a valve system for a vehicle engine arrangement, the valve system comprising: a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; a rotary valve comprising a valve rotor which rotates about a valve axis within the valve chamber, the valve rotor having axially offset endwalls and opposing internal walls; wherein the valve rotor is rotatable about the valve axis to selectively permit or block exhaust gas flow through the bypass port; and wherein the valve chamber comprises axially recessed endwalls relative to the inlet port, the valve rotor endwalls being received by the recessed endwalls of the valve chamber to reduce leakage between the respective endwalls in use.

The engine arrangement may form part of an automotive vehicle such as an automobile. More specifically, the vehicle may be a car or a truck. The engine arrangement may be an internal combustion engine. The turbine may form part of a turbocharger or a power turbine.

The endwalls of the valve chamber may be axially recessed by such an extent that the internal walls of the valve rotor are substantially aligned with edges or an edge of the inlet port. Alternatively, the endwalls of the valve chamber may be axially recessed such that the internal walls of the valve rotor are recessed relative to edges or the edge of the inlet port. In other words, the axial offset between the internal walls of the valve rotor is greater than, or equal to, a diameter or of the inlet port (i.e. where the inlet port is circular or generally circular) or the axial offset between axially offset edges of the inlet port (i.e. where the inlet port is rectangular or generally rectangular).

The valve chamber comprising axially recessed endwalls is advantageous for reasons of reduced leakage. The recessed endwalls of the valve chamber cooperate with the endwalls of the valve rotor to create a more tortuous path for the exhaust gas flow, akin to a labyrinth seal, thereby reducing leakage. Were it not for the recessed endwalls, more exhaust gas may be able to flow around the endwalls of the valve rotor. Such a leakage path means that even when the valve rotor is in the bypass port blocking position, exhaust gas may still pass through the bypass port. This can lead to inefficiencies when it is desired to prevent exhaust gas from flowing through the bypass port (and thereby bypassing the turbine).

The axially recessed endwalls of the valve chamber may also be advantageous for reasons of locating the valve rotor in the valve chamber. The endwalls of the valve rotor and valve chamber may cooperate to define location features to more effectively axially constrain the valve rotor in the valve chamber. Assembly and maintenance are made simpler as a result.

The axially recessed endwalls of the valve chamber may also be beneficial for reasons of avoiding turbulent eddies just downstream of the inlet port, as the exhaust gas flow enters the valve chamber. Were it not for the axially recessed endwalls of the valve chamber, internal walls of the valve rotor may create an internal step in the exhaust gas flow path. Turbulent eddies are liable to form at the edges of the internal step. The formation of turbulent eddies marks the onset of turbulent flow, which represents a reduced exhaust gas flow rate. Furthermore, turbulent flow risks damaging the rotary valve and is therefore undesirable.

According to a sixth aspect of the disclosure there is provided a valve system for an engine arrangement, the valve system comprising: a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; a rotary valve comprising a valve rotor which rotates about a valve axis within the valve chamber, the valve rotor comprising a plurality of axially offset endwalls and a sealing plate disposed between the endwalls; wherein the valve rotor is rotatable about the valve axis to selectively permit or block exhaust gas flow through the bypass port, the valve rotor configured to block exhaust gas flow through the bypass port when the sealing plate abuts one or more rods disposed in the valve chamber.

The engine arrangement may form part of an automotive vehicle such as an automobile. More specifically, the vehicle may be a car or a truck. The engine arrangement may be an internal combustion engine. The turbine may form part of a turbocharger or a power turbine.

Rod is intended to mean a body which comprises a curved surface. The rod or rods may be cylindrical axially extending bodies. Alternatively, the rods may be, for example, axially extending rectangular prisms with a curved surface which contacts the sealing plate. The rod or rods may be integrally formed as part of the valve chamber by, for example, a machining process. Alternatively, the rod or rods may be distinct bodies which are incorporated in the valve chamber using a separate joining method.

The rod or rods are advantageous because they are abutted by the sealing plate and so the machining tolerances for the valve rotor can be reduced as a result. Furthermore, the machining tolerances of the valve chamber can be reduced. Cost is thereby reduced.

The rod or rods being abutted by the sealing plate is also beneficial because the accuracy of the rotational movement of the valve rotor can be reduced. Machining tolerances of the rotary valve generally, as well as spindle-receiving recesses of the valve chamber, can be reduced. The rotational precision required by a bush in the spindle-receiving recess, if used, can also be reduced as a result.

A plurality of rods may be disposed in the valve chamber.

The one or more rods may be axially positioned in the valve chamber.

Advantageously, the valve is a rotary valve which rotates about a valve axis, and the valve member is a valve rotor, and wherein the valve system is configured such that the valve system exhibits the following flow regimes in order as the valve rotor rotates from a position in which the outlet port is substantially blocked:

(i) a 100% bypass regime in which the outlet port is substantially blocked by the valve rotor;

(ii) a forced bypass regime in which the bypass port is open and the outlet port is at least partially open;

(iii) a wastegate regime in which the outlet port is open and the bypass port is at least partially open;

(iv) a 100% turbocharger regime in which the bypass port is substantially blocked and the inlet and outlet ports are open;

(v) a back pressure turbocharger only regime in which the bypass port is substantially blocked and the inlet port is at least partially blocked;

(vi) a braking regime in which the inlet port is substantially blocked; and (vii) a poor control regime in which the bypass port is open, and the inlet and outlet ports are at least partially open.

Advantageously, the valve is a rotary valve which rotates about a valve axis, and the valve member is a valve rotor, and wherein the valve system is configured such that the angle $\gamma$ subtended about the valve axis by each of the inlet port and outlet port is given by:

$$\gamma=360-2\delta-\beta/3+2c$$

where $\delta$ is an angle subtended about the valve axis between the inlet and bypass ports; c is the ratio of an angle subtended about the valve axis by the bypass port relative to the angle subtended about the valve axis by each of the inlet port and outlet port, such that an angle subtended about the valve axis by the bypass port is given by c multiplied by $\gamma$; and $\beta$ is an angle subtended about the valve axis between the inlet port and the outlet port.

According to a seventh aspect of the disclosure there is provided a method of operating the valve system according to the fourth, fifth and sixth aspects of the disclosure, wherein the valve is a rotary valve which rotates about a valve axis, and the valve member is a valve rotor, and wherein the valve system exhibits the following flow regimes in order as the valve rotor rotates from a position in which the outlet port is substantially blocked:

(i) a 100% bypass regime in which the outlet port is substantially blocked by the valve rotor;

(ii) a forced bypass regime in which the bypass port is open and the outlet port is at least partially open;

(iii) a wastegate regime in which the outlet port is open and the bypass port is at least partially open;

(iv) a 100% turbocharger regime in which the bypass port is substantially blocked and the inlet and outlet ports are open;

(v) a back pressure turbocharger only regime in which the bypass port is substantially blocked and the inlet port is at least partially blocked;

(vi) a braking regime in which the inlet port is substantially blocked; and (vii) a poor control regime in which the bypass port is open, and the inlet and outlet ports are at least partially open.

It will be appreciated that any of the above-discussed aspects of the disclosure may, where appropriate, be combined with one or more other aspects of the disclosure. Furthermore, an optional feature described in relation to one of the aspects of the disclosure may, where appropriate be an optional feature of one of the other aspects of the disclosure.

BRIEF DESCRIPTION OF THE DRAWINGS

The disclosure will now by described by way of example, with reference to the accompanying figures in which.

DETAILED DESCRIPTION OF EMBODIMENTS OF THE DISCLOSURE

Figure 1:
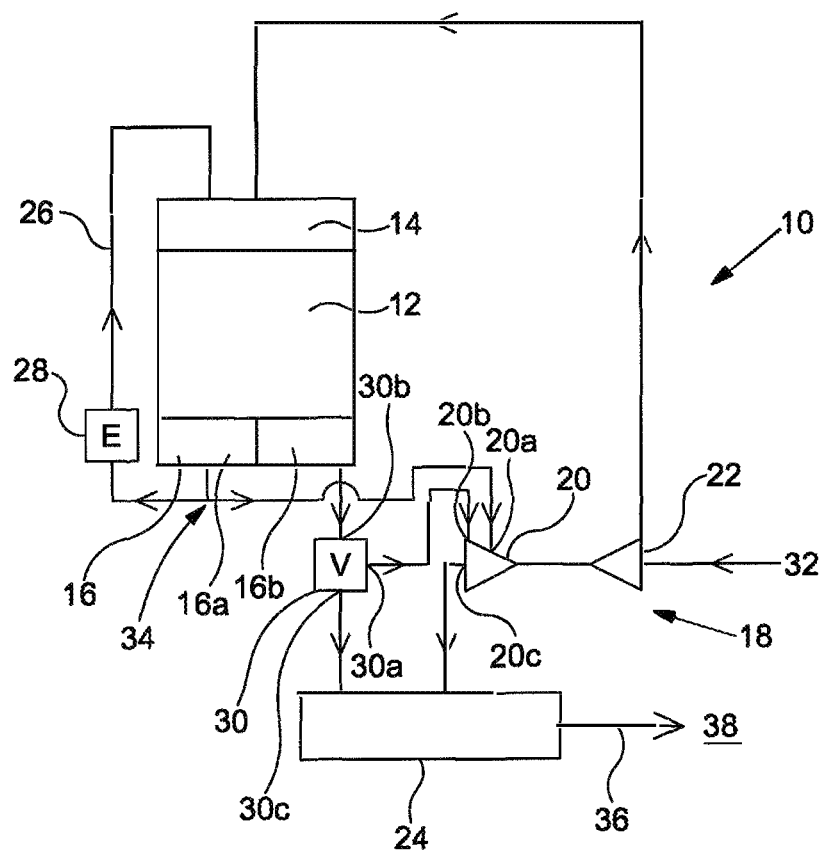
FIG. 1 shows a schematic view of a known engine arrangement of which a valve system according to an embodiment of the present disclosure may form part.

FIG. 1 shows a schematic view of a known engine arrangement 10. The engine arrangement includes a plurality of combustion chambers 12 which are connected to an inlet manifold 14 and an outlet manifold 16. The outlet manifold 16 is separated into a first portion 16a and a second portion 16b. The first portion 16a of the outlet manifold is connected to a first set (not shown) of combustion chambers 12, and the second portion 16b of the outlet manifold 16 is connected to a second set (again, not shown) of the combustion chambers 12.

The engine arrangement also comprises a turbocharger 18 having a turbine 20 and a compressor 22. The engine arrangement further includes an exhaust after treatment device or system 24, an EGR circuit 26 which includes an EGR valve 28, and, finally, a valve system 30. The valve system 30 may also be referred to as a turbine bypass valve.

In use, the combustion chambers 12 are supplied with fuel and air, the air is provided from the atmosphere via the engine air inlet 32, the air passing through the compressor 22 of the turbocharger 18 and inlet manifold 14. Once the fuel and air has been burnt in the combustion chambers 12, exhaust gas is produced which passes to the outlet manifold 16. The exhaust gas from the first portion 16a of the exhaust manifold 16 is supplied to a T-junction 34 at which it is split so that it flows both to an EGR (exhaust gas recirculation) circuit 26 and to a first inlet 20a of the turbine 20 of the turbocharger 18. The EGR circuit 26 passes back to the inlet manifold 14 and the EGR valve 28 controls the amount of exhaust gas which passes into the EGR circuit 26. The manner in which the EGR circuit functions is entirely conventional and is not key to the present disclosure. Consequently, for the sake of brevity, further discussion as to the operation of the EGR circuit is omitted.

The turbine 20 of the turbocharger 18 is a twin inlet (or twin volute) turbine. As such, the turbine includes a second inlet 20b. This inlet 20b of the turbine 20 is supplied with exhaust gas by an outlet port 30a (first outlet) of a valve chamber of the valve system 30. The valve chamber of the valve system 30 is supplied with exhaust gas from the second portion 16b of the exhaust manifold 16 via an inlet port 30b of the valve chamber.

The exhaust gas provided to the turbine 20 of the turbocharger 18 via the inlets 20a, 20b causes a turbine wheel (not shown) of the turbine 20 to rotate. The exhaust gas then exits the turbine 20 via the turbine outlet 20c and passes to an exhaust after-treatment device or system 24. The exhaust gas then exits the after-treatment device or system 24 via an engine outlet 36 to atmosphere 38. The rotation of the turbine wheel of the turbine caused by the exhaust gases provided to the turbine 20 causes rotation of a compressor wheel (again, not shown) of the compressor 18. Rotation of the compressor wheel results in air at atmospheric pressure drawn in through the engine inlet 32 to be pressurised to an elevated (or boost) pressure by the compressor wheel. This pressurised gas is then supplied to the inlet manifold 14 as previously discussed.

The valve chamber of the valve system 30 also includes a bypass port 30c (second outlet) which is connected to the after-treatment device or system 24.

The valve system 30 comprises the valve chamber and a rotary valve. The rotary valve comprises a valve rotor.

The rotary valve, and so valve rotor, can be controlled so that it is possible to selectively open the bypass port 30c (second outlet). When the bypass port 30c (second outlet) is open, at least some of the exhaust gas from the second portion 16b of the outlet manifold 16 which would have otherwise passed to the inlet 20b of the turbine 20 can flow via the outlet port 30c to the after-treatment device or system 24. Such gas is said to bypass the turbine 20. The ability for gas to bypass the turbine 20 may be advantageous in several situations. First, in a situation where the turbine 20 is over speeding, the ability to bypass the turbine, and thereby reduce the amount of exhaust gas being supplied to the turbine will reduce the amount of exhaust gas rotating the turbine wheel and hence reduce the speed of the turbine wheel. Secondly, in some applications, the after-treatment device or system 24 may only function effectively when it is at a required operation temperature. This may be the case when the after-treatment device or system 24 includes a temperature-sensitive catalyst. The required operating temperature of the after-treatment device or system 24 may be considerably in excess of room temperature. Consequently, at some point during the operation of the engine arrangement 10 (for example just after engine switch on) the after-treatment device or system 24 may be operating at a temperature below the required operating temperature. In this situation, the valve rotor can rotated such that some of the hot exhaust gas which would otherwise pass to the turbine 20, passes to the after-treatment device or system 24 without passing through the turbine 20, thereby causing the temperature of the after-treatment device or system 24 to be raised relatively quickly so that it can reach its operating temperature.

Once it is no longer desired to allow some of the exhaust gas from the second portion 16b of the exhaust manifold 16 to bypass the turbine 20, the rotary valve can be rotated so as to close the bypass port 30c (second outlet) and ensuring that all of the exhaust gas passing into the valve system from the second portion 16b of the exhaust manifold 16 passes to the turbine 20 of the turbocharger 18.

The engine arrangement 10 described above provides context as to the operation of a valve system (comprising a rotary valve or turbine bypass valve). It will be appreciated that a valve system according to the present disclosure may be utilised as part of any appropriate engine arrangement. The specific structural details of the valve system 30, valve chamber and rotary valve according to the present disclosure are now discussed in more detail below.

Figure 3:
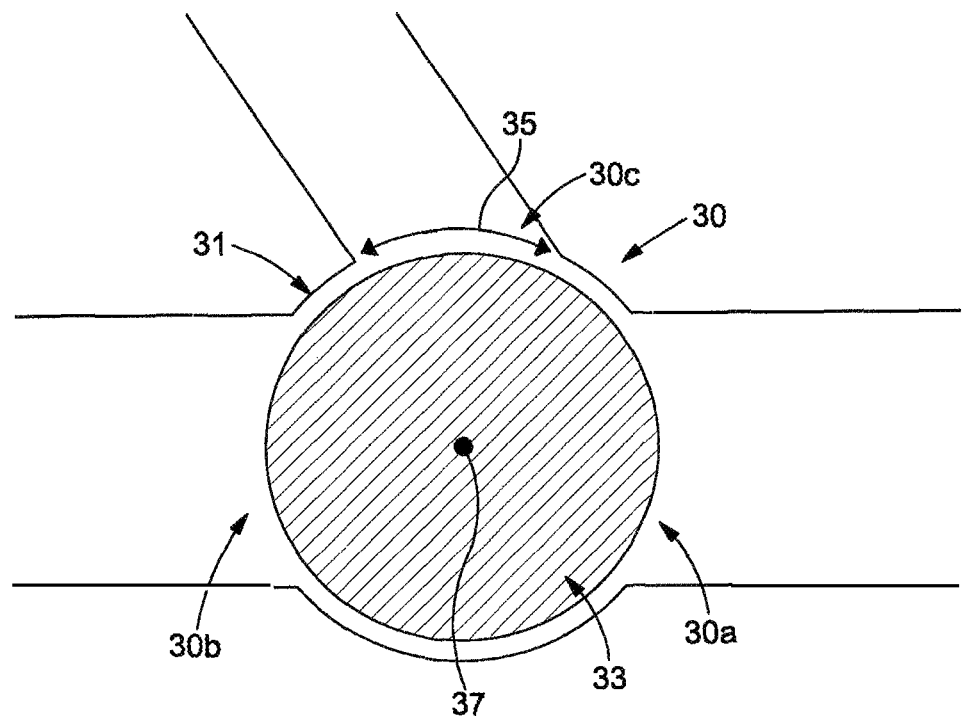
FIG. 3 shows a schematic cross-sectional view of the valve system according to an embodiment of the present disclosure.

FIG. 3 shows a schematic view of the valve system 30. As mentioned above, the valve system 30 comprises the valve chamber 31 and rotary valve 33.

The rotary valve 33 is positioned within the valve chamber 31 such that rotation of the rotary valve 33, and in particular a valve rotor of the rotary valve 33, can selectively permit or block exhaust gas flow through bypass port 30c.

The rotary valve 33 rotates about valve axis 37 as indicated by arrow 35. Valve axis 37 is defined by the valve chamber 31. References to an axial direction of the valve system 30 or constituent components refer to the direction parallel to valve axis 37. That is to say, in FIG. 3, the axial direction is that normal to the plane of the page. The rotary valve 33 is described in greater detail in connection with FIG. 4.

The valve chamber 31 comprises the inlet port 30b, outlet port 30a and bypass port 30c. Also shown in FIG. 3 are connections to/from the ports 30a-c (i.e. extensions of pipework beyond the ports). Said connections may be in the form of directly connected pipes, indirectly connected pipes or other suitable means for directing exhaust gas flow to or from the valve system 30.

The valve system 30 arrangement shown in FIG. 3 is generally applicable to all of the embodiments of the various aspects of the disclosure disclosed in this application. Deviations from the arrangement illustrated in FIG. 3 will be described in more detail. It should also be noted that although all of the aspects of the present disclosure below are described in relation to a rotary-type valve arrangement, certain aspects of the disclosure are equally applicable to any type of valve arrangement.

Figure 4:
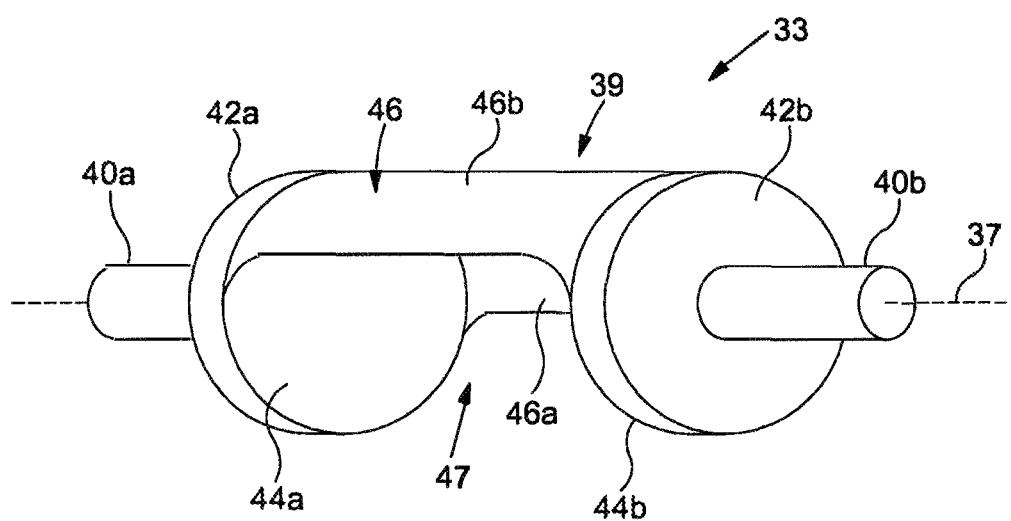
FIG. 4 shows a schematic view of a rotary valve of the valve system according to an embodiment of the present disclosure.

FIG. 4 shows a schematic view of the rotary valve 33 of the valve system 30. The rotary valve 33 comprises valve rotor 39 and spindles 40a, 40b extending therefrom. Also indicated is the axis of rotation about which the rotary valve 33 rotates, the valve axis 37.

The valve rotor 39 is a main body portion of the rotary valve 33. The valve rotor comprises endwalls 42a, 42b. These endwalls 42a, 42b are axially offset from one another and so may be referred to as axially offset endwalls. The axially offset endwalls 42a, 42b define an outermost edge of the valve rotor 39. When positioned in the valve chamber 31, the axially offset endwalls 42a, 42b are received by the valve chamber 31.

Spindles 40a, 40b extend axially outwards from the axially offset endwalls 42a, 42b. The spindles 40a, 40b are generally cylindrical and provide an axle about which the rotary valve 33 rotates. The spindles 40a, 40b are received by the valve chamber 31. The spindles 40a, 40b may be a geometry other than generally cylindrical provided that the valve rotor 39 is able to rotate about the valve axis 37.

The valve rotor 39 also comprises opposing internal walls 44a. 44b. Opposing internal walls 44a, 44b are also axially offset along the valve axis 37.

Positioned between internal walls 44a, 44b is sealing section 46. Sealing section 46 comprises an internal surface 46a and external surface 46b. Sealing section 46 also defines a cavity 47.

With the rotary valve 33 in position in the valve chamber 31, the rotational position of the rotary valve 33 dictates whether exhaust gas flow is permitted through, or blocked from passing through, the bypass port 30c. When the rotary valve 33 is in a bypass port blocking position, the rotary valve 33 is in a rotational position such that the external surface 46b of sealing section 46 covers, or substantially covers, bypass port 30c. Exhaust gas flow is thereby substantially prevented from flowing through the bypass port 30c.

When the rotary valve 33 is not in a bypass port blocking position, the rotary valve 33 is in a rotational position such that the relative alignment of the external surface 46b of sealing section 46 and bypass port 30c permits passage of exhaust gas flow through the bypass port 30c. That is to say, exhaust gas is able to flow into the bypass port 30c via the cavity 47 of valve rotor 39. Depending on the geometry of the valve rotor 39, when the rotary valve 33 is not in the bypass port blocking position, internal surface 46a of the sealing section 46 may obstruct the flow of exhaust gas flow such that the flow is impeded and is deflected towards the bypass port 30c. That is to say, in certain rotary valve 33 positions, and with certain valve rotor 39 geometries, the internal surface 46a may act as a deflector plate for the exhaust gas flow. It will be appreciated that exhaust gas flow is able to flow through the cavity 47 of valve rotor 39.

The rotary valve 33 may be turned from a single piece of metal. Alternatively, endwall sections may be manufactured separately before being combined with the sealing section 46 in a separate operation. The rotary valve 33 may include other sealing features in order to improve valve performance. These will be described in more detail below in connection with embodiments of the various aspects of the disclosure.

As explained in connection with FIG. 3, the rotary valve 33 arrangement shown in FIG. 4 is generally applicable to all of the embodiments of the various aspects of the disclosure disclosed in this application, save for the embodiment according to the fifth aspect of the disclosure. Deviations from the arrangement illustrated in FIG. 4 will be described in more detail.

Figure 5:
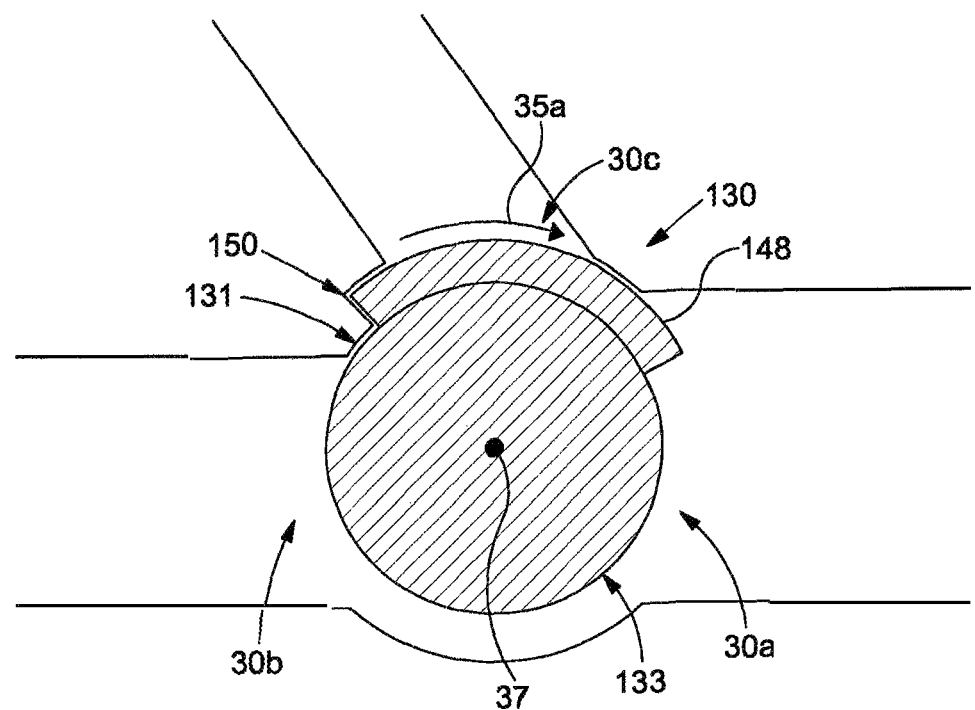
FIGS. 5 and 6 show schematic views of two valve rotor positions of a valve system according to an embodiment of the first aspect of the present disclosure.
Figure 6:
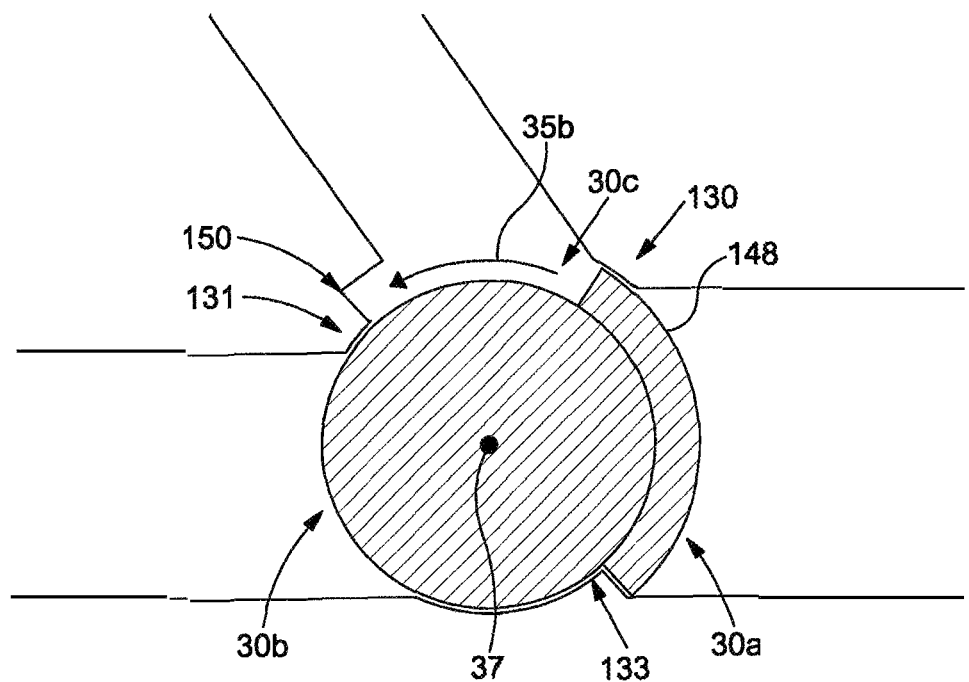

FIGS. 5 and 6 show a schematic view of two valve rotor positions of a first embodiment of a valve system 130 according to the first aspect of the present disclosure.

The valve system 130 is generally similar to that previously described. A rotary valve 133 rotates about valve axis 37 in valve chamber 131 to selectively permit or block exhaust gas flow from passing through bypass port 30c. Inlet port 30b and outlet port 30a also remain unchanged.

A distinction between the valve system 130 of FIGS. 5 and 6 relative to that of FIGS. 3 and 4 is the inclusion of a protrusion 148 on rotary valve 133 and a corresponding recess 150 in valve chamber 131.

Protrusion 148 protrudes outwards from an axial footprint of valve rotor 139. The protrusion may be said to protrude radially from the valve rotor 139. The protrusion 148 may be connected to or form part of one or more of each endwall of the valve rotor 139 and the sealing portion 146. When the rotary valve 133 is in a bypass port blocking position, as shown in FIG. 5, the protrusion 148 is received by recess 150.

Recess 150 is a recessed portion of the valve chamber 131. The recess 150 is shaped to receive protrusion 148. In the illustrated example, the protrusion 148 is arcuate when viewed in the axial direction. As such, the recess 150 is a similarly arcuate cut-out of the valve chamber 131. The recess 150 intrudes slightly into bypass port 30c in FIG. 5. However, the recess 150 may be located at other circumferential positions around the valve chamber 131 such that the recess 150 intrudes more, or less, into bypass port 30c. Furthermore, alternative geometries of protrusion 148 and recess 150 are contemplated. The only requirement is that the recess is shaped to receive the protrusion.

The protrusion 148 and recess 150 assist in reducing leakage of exhaust gas flow through the bypass port 30c when such leakage is not required or desired.

The protrusion 148 and recess 150 also define a labyrinth seal between the two respective bodies. That is to say, the path for exhaust gas to flow between the protrusion 148 and the recess 150 is more tortuous due to the presence of the protrusion 148 and recess 150. This also assists in reducing leakage of exhaust gas flow around the outside of the rotary valve 133.

FIG. 5 shows the rotary valve 133 in the bypass port blocking position. Note that the geometry of a valve rotor of the rotary valve 133 of FIGS. 5 and 6 is generally similar to that of FIG. 3, save for the protrusion 148. In this position, exhaust gas flow is substantially prevented from flowing through the bypass port 30c. The rotary valve 133 is in the position of minimum rotational travel (or the furthest rotational extent possible in the anticlockwise direction) in this position and so the protrusion 148 is shown being received by the recess 150. In other words, recess 150 defines the backstop position to prevent the rotary valve 133 from rotating any further. From the position of the rotary valve 133 shown in FIG. 5, the only rotational travel possible is indicated by arrow 35a i.e. clockwise.

FIG. 6 shows the rotary valve 133 in a position other than the bypass port blocking position. In particular, FIG. 6 shows the rotary valve 133 in a position which is substantially preventing exhaust gas from flowing through outlet port 30a. Although this is the position illustrated in FIG. 6, this is not intended to be limiting and in practice it is likely that such a maximum rotational travel would not block as much of the outlet port 30a as shown in FIG. 6. In FIG. 6 the only rotational travel possible for the rotary valve 133 is shown by arrow 35b i.e. anti-clockwise.

Although FIGS. 5 and 6 illustrate the protrusion 148 forming part of the rotary valve 133 and the recess 150 being part of the valve chamber 131, this arrangement could be reversed. That is to say, the valve chamber 131 could incorporate a protrusion and the rotary valve 133 could incorporate the recess.

Figure 7:
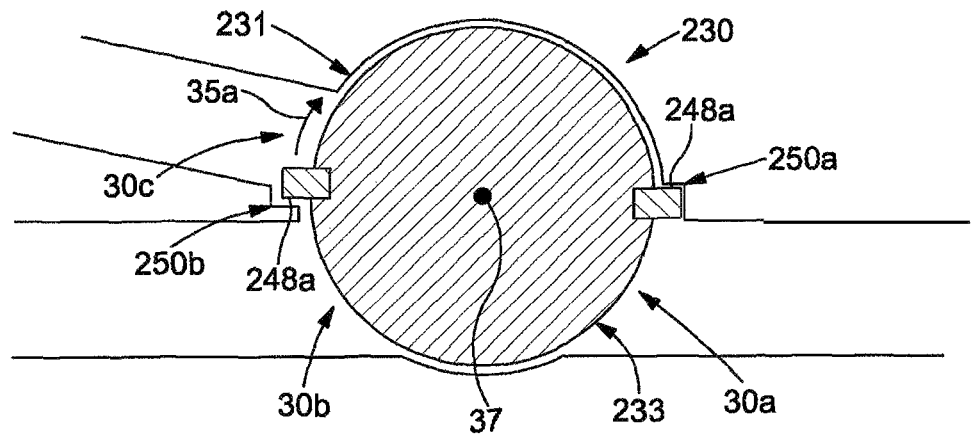
FIGS. 7 and 8 show schematic views of two valve rotor positions of the valve system according to a further embodiment of the first aspect of the present disclosure.
Figure 8:
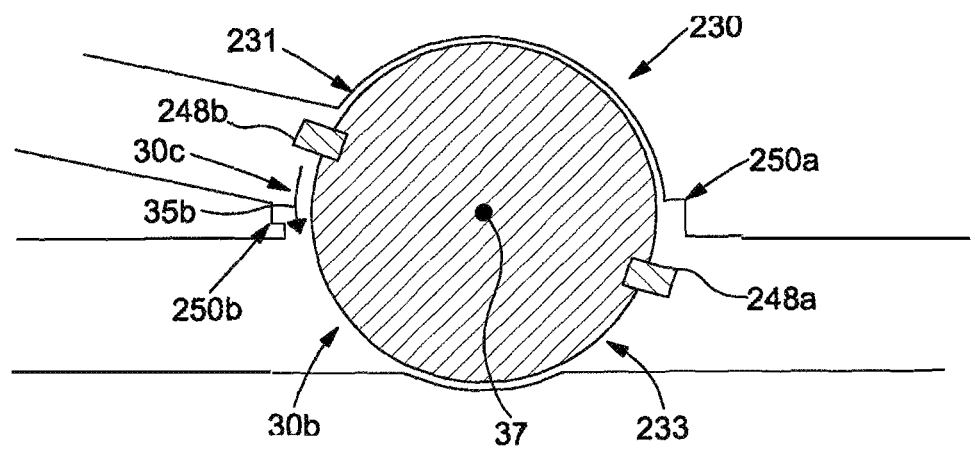

FIGS. 7 and 8 show a schematic view of two valve rotor positions of a second embodiment of valve system 230 according to the first aspect of the disclosure.

Like that of FIGS. 5 and 6, the valve system 230 is generally similar to that previously described. A rotary valve 233 rotates about valve axis 37 in valve chamber 231 to selectively permit or block exhaust gas flow from passing through bypass port 30c. Inlet port 30b and outlet port 30a also remain unchanged.

A distinction between the valve system 230 of FIGS. 7 and 8 relative to that of valve system 130 of FIGS. 5 and 6 is the inclusion of a second protrusion 248b and corresponding recess 250b on rotary valve 233 and in valve chamber 231 respectively.

Furthermore, instead of an arcuate recess, the protrusions 248a, 248b and recesses 250a. 250b of the present embodiment are step-like in form. That is to say, with respect to the recesses, the recesses 250a, 250b are stepped cut-outs in the valve chamber 231. The protrusions may be said to be generally rectangular. However, the recesses 250a. 250b and protrusions 248a, 248b could more closely mirror that of the first embodiment of the first aspect of the disclosure by, for example, being arcuate when viewed in axial cross-section. The disclosed geometries are not intended to be limiting and it will be appreciated that a variety of alternative geometries could otherwise be implemented.

The directions of rotational travel possible for the rotary valve 233 in FIGS. 7 and 8 are indicated by arrows 35a and 35b respectively.

The advantages of, and possible modifications to, the arrangement of FIGS. 5 and 6 are also generally applicable to FIGS. 7 and 8. In particular, the protrusions 248a, 248b can be located at a number of circumferential positions around the rotary valve 133. An advantage of having two protrusions 248a, 248b and two recesses 250a, 250b is that sealing may be further improved and so leakage further reduced.

Figure 9:
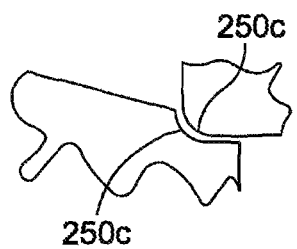
FIG. 9 shows a schematic view of a further embodiment of the valve system according to the first aspect of the present disclosure.

In a further embodiment, as shown in FIG. 9, protrusion 250c incorporates a radius along a recess-facing edge and recess 250c incorporates a radius along a protrusion-facing edge. This is beneficial for reasons of simpler machining by, for example, a mill, and improved sealing. Furthermore, removing sharp edges/corners from geometries is beneficial because corners are areas of high stress concentration which can give rise to component failure by, for example, cyclic thermal fatigue. The radii illustrated in FIG. 9 may therefore be incorporated in the first or second embodiments of the first aspect of the disclosure, as illustrated in FIGS. 5-6 and 7-8 respectively.

Figure 10:
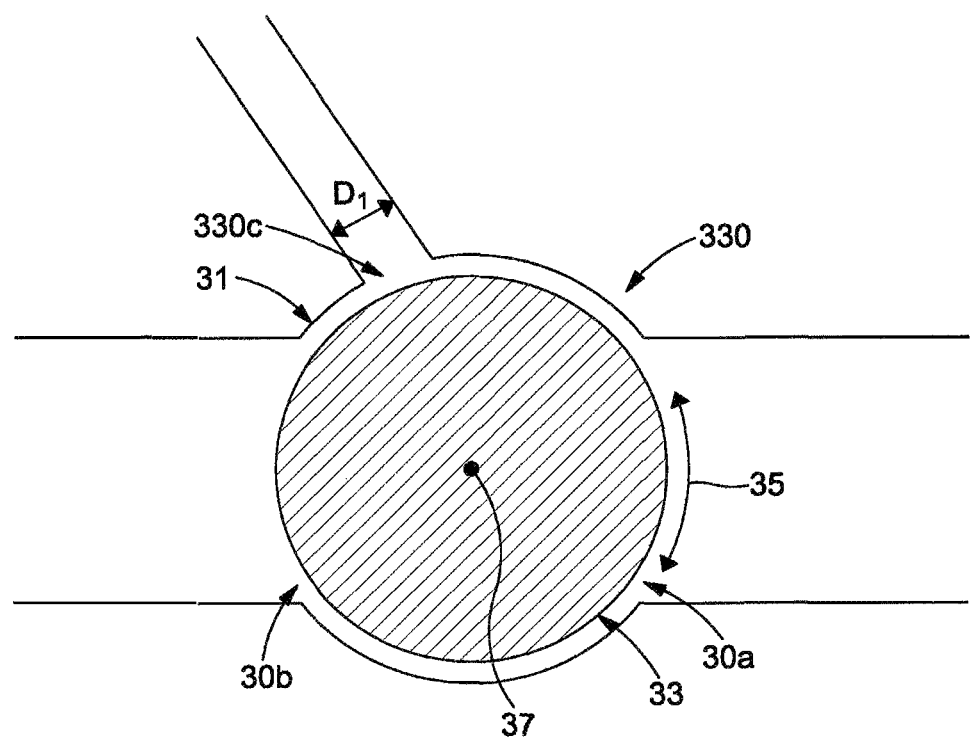
FIG. 10 shows a schematic view of an embodiment of a valve system according to a second aspect of the present disclosure.

FIG. 10 shows a schematic view of an embodiment of a valve system 330 according to the second aspect of the present disclosure.

Rotary valve 33 is generally similar to that described in connection with FIG. 3. However, valve chamber 331 is modified.

Valve chamber 331 comprises inlet port 30b, outlet port 30a and modified bypass port 330c. Inlet and outlet ports 30a, 30b are unchanged.

Bypass port 330c is generally rectangular. That is to say, rather than the distance $D_1$ being a diameter, it is a length of a short side of a trapezoidal shape such as, for example, a rectangle. The magnitude of dimension $D_1$ is also comparatively less than for the other embodiments described thus far. In order to provide sufficient cross-sectional area through the bypass port 330c for the passage of exhaust gas, the bypass port 330c is extended in the axial direction. That is to say, a major dimension of the bypass port 330c is in the axial direction. For example, where the bypass port 330c is rectangular, and when viewed in axial cross-section as in FIG. 10, $D_1$ represents a height of the rectangle whilst the major dimension of the bypass port 330c is the width of the rectangle. Bypass port 330c may therefore be akin to a letterbox in geometry. Such geometry means that the required rotation of the rotary valve 33 in order to open or close bypass port 330c is reduced. Valve rotor wear is thereby reduced because the rotary valve 33 is not required to rotate as much with the generally rectangular geometry of bypass port 330c. In order to allow for simpler machining, the bypass port 330c may be rectangular save for radii at internal corners of the rectangle.

In one embodiment the valve axial length may be 150 mm. The radial width may be 10 mm. The inlet port area may be a 70 mm diameter pipe with a cross-sectional area of about 3800 mm². The bypass port may be ¹⁄₁₀ the area of the inlet port. This results in an aspect ratio~4:1. The aspect ratio may be anywhere between 1.5:1 to 10:1.

Valve rotor 39 of rotary valve 33 may be axially extended to take into account the increase in the axial length of the bypass port 330c.

Figure 11:
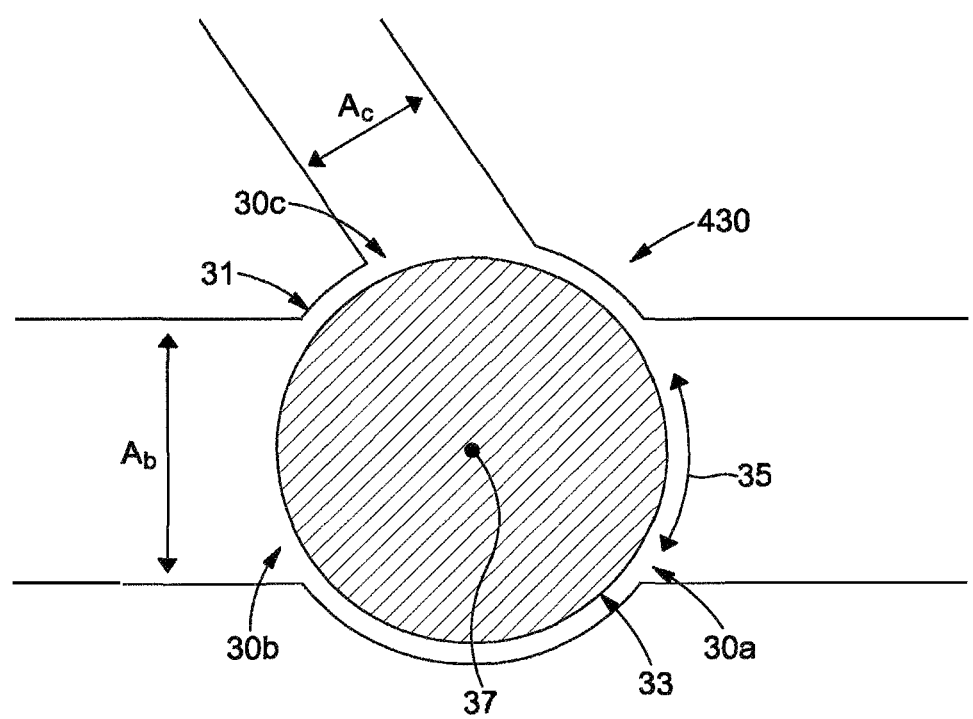
FIG. 11 shows a schematic view of an embodiment of a valve system according to a third aspect of the present disclosure.

FIG. 11 shows a schematic view of an embodiment of a valve system 430 according to the third aspect of the present disclosure.

Figure 2:
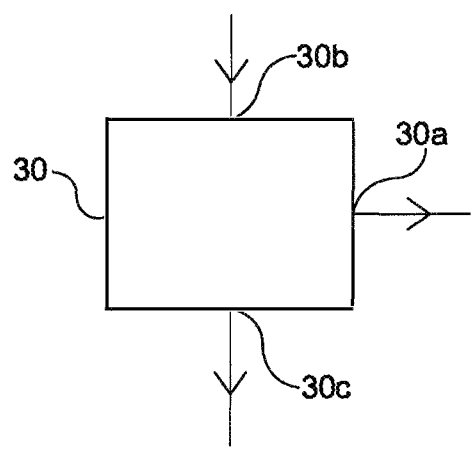
FIG. 2 shows an enlarged schematic view of a valve system according to an embodiment of the present disclosure.

Rotary valve 33 and valve chamber 31 are generally the same as that described in connection with FIG. 2. However, in valve system 430 a cross-sectional area $A_c$ of the bypass port 30c (i.e. the area through which gas flowing through the bypass port experiences) is less than a cross-sectional area $A_b$ of the inlet port 30b (i.e. the area through which gas flowing through the inlet port experiences).

This arrangement is useful for generating a pressure drop across the bypass port 30c. A greater pressure drop across the bypass port means that it is harder for the engine to expel exhaust gas since the pistons have to push the exhaust gas out against a higher 'back pressure'. This increases the 'pumping work' (work done on the exhaust stroke, to pump gas out against the 'back pressure') done by the engine and, if nothing else changed, the engine power output would be reduced thus reducing engine speed. Under idle conditions, it is not desirable to have the engine speed drop so to compensate, the fuel rate is increased—to make more power to overcome that lost by increased pumping. More fuel means lower air to fuel ratio and hence a higher exhaust gas flow temperature. When diverted via the bypass port 30c to the exhaust aftertreatment device or system 24, the increased temperature of the exhaust gas flow can be used to more quickly activate the exhaust aftertreatment device or system 24.

Figure 12:
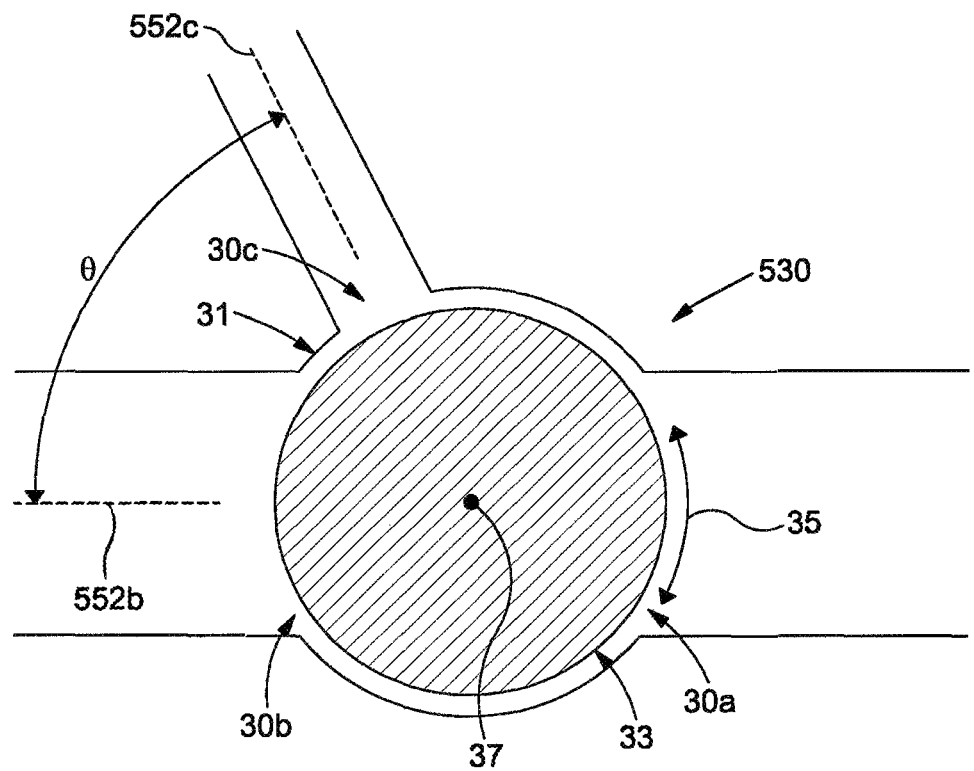
FIG. 12 shows a schematic view of a valve system according to an embodiment of the fourth aspect of the present disclosure.

FIG. 12 shows a schematic view of a valve system 530 according to an embodiment of a fourth aspect of the present disclosure.

Rotary valve 33 and valve chamber 31 are generally the same as that described in connection with FIG. 2. However, in valve system 530, a relative angle θ between the bypass port 30c and the inlet port 30b is acute. That is to say, the bypass port 30c is positioned at an acute angle relative to the inlet port 30b. The relative angle θ between the bypass port 30c and the inlet port 30b is therefore less than 90°.

The relative angle θ is taken between extension axes 552b and 552c along which the inlet port 30b and bypass port 30c respectively extend.

The arrangement is useful for the same reasons explained above in connection with FIG. 11. That is to say, a pressure drop is created across the bypass port 30c due to the relative positioning of the inlet port and bypass port, which leads to an increase in the pumping work, required, an increase in the temperature of the exhaust gas flow, and so quicker activation of the exhaust aftertreatment device or system 24.

Figure 16:
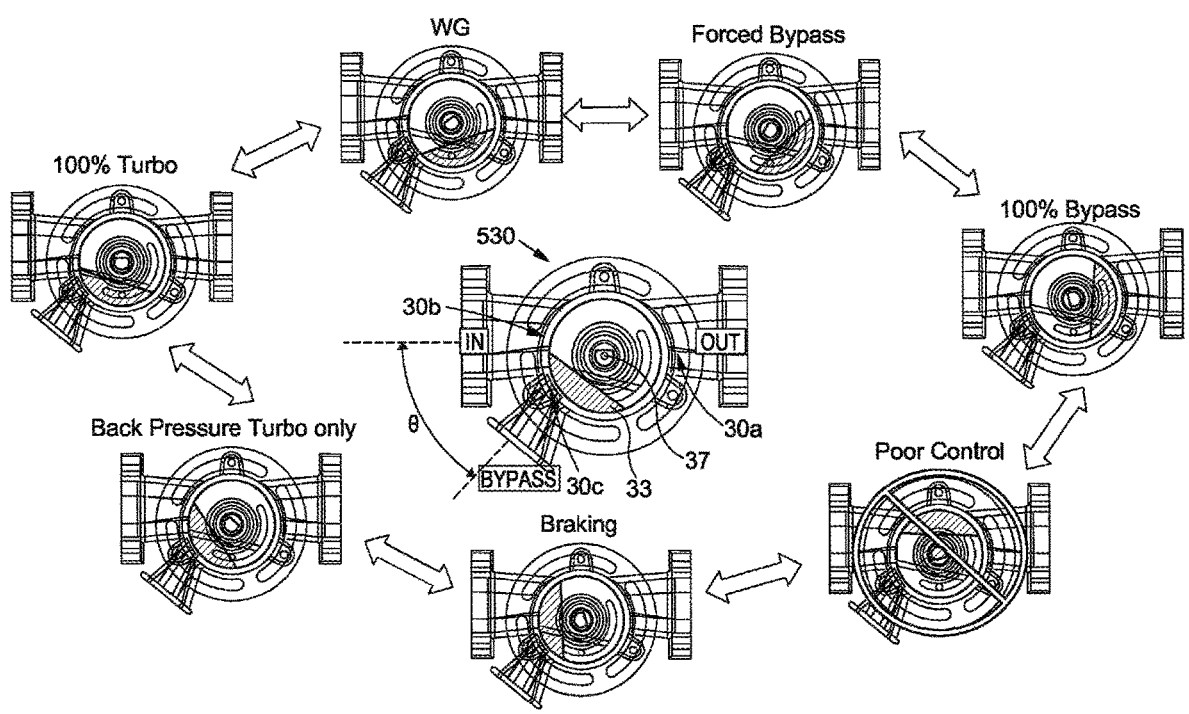
FIG. 16 shows schematic views of the valve system of FIG. 12 as the rotary valve rotates through 360°, with corresponding flow regimes indicated thereon.

FIG. 16 shows schematic views of the valve system 530 of FIG. 12 as the rotary valve 33 rotates 360° about the axis 37.

Initially describing the central arrangement illustrated in FIG. 16, the valve system 530 comprises the inlet port 30b, outlet port 30a and bypass port 30c. Each of these ports is in communication with a respective inlet, outlet and bypass. Of note, a distinction in the FIG. 16 arrangement is that the rotary valve 33 is shown in a partially cross section view (the cross section is taken perpendicular to the axis of rotation of the rotor and about half way along the axial length of the rotor). As such, rather than being a side on view as illustrated in the previous figures, the FIG. 16 arrangement shows a semi-circular rotary valve 33. Put another way, the rotary valve 33 is illustrated as a segment.

It will also be appreciated that, because FIG. 16 relates to the valve system 530 of FIG. 12, the angle θ between the inlet port 30b and bypass port 30c is acute. That is to say, the angle θ is less than 90°.

The sequence of figures which surround the annotated valve system 530 of FIG. 16 show the various modes of operation and flow regimes which occur based upon the rotational position of the rotary valve 33. In other words, each of the flow regimes corresponds with a particular rotational position of the rotary valve 33. For clarity, and to avoid unnecessary repetition, reference numerals are omitted from the sequence of operation figures.

Each of the modes of operation will now be discussed in some detail, describing the position of the rotary valve 33 in relation to the inlet, outlet and bypass ports 30b, 30a, 30c. The flow regimes which occur in the respective modes of operation will also be explained.

The operating modes are explained, beginning at the "100% Turbo" flow regime, and moving in a counter clockwise direction. Whilst the counter clockwise direction of the figures is described (i.e. moving around the different flow regimes in a counter clockwise direction), the rotary valve 33 moves in the clockwise direction as you move between flow regimes in the counter clockwise direction. It will be appreciated that, in the FIG. 16 orientation, the clockwise direction refers to a direction of rotation of the rotary valve 33 which, starting from the bypass port 30c being substantially blocked, rotates towards the inlet port 30b and then the outlet port 30a. In other words, clockwise refers to a direction in which the rotary valve 33 rotates towards the outlet port 30a, passing first across the inlet port 30b.

The flow regime "100% Turbo", or "100% Turbocharger", refers to a rotary valve 33 position wherein the inlet port 30b and outlet port 30a are fully open. That is to say, the rotary valve 33 does not partially or completely block flow through either of the inlet and outlet ports 30b, 30a. In this position, bypass port 30c is completely blocked by the rotary valve 33. Because the bypass port 30c is blocked, to prevent exhaust gas flow therethrough, and the inlet and outlet ports 30b, 30a are unobstructed, all of the exhaust gas flow passing through the inlet port 30b passes through the outlet port 30a. As such, all of the exhaust gas flow entering the valve system 530 flows to the turbocharger. Hence, the regime is "100% Turbo", or "100% turbocharger".

As the rotary valve 33 continues to rotate in the clockwise direction, the inlet port 30b begins to become blocked by the rotary valve 33. Initially, the inlet port 30b is mostly open and only slightly blocked by the rotary valve 33, and the blocking, or obstruction, increases as the rotary valve 33 continues to rotate. In this rotary valve position, the outlet port 30a remains fully open. Because the inlet port 30b is at least partially obscured by the rotary valve 33, this rotary valve 33 position generates a back pressure. That is to say, due to the reduced cross sectional area of the inlet port 30b through which exhaust gas flow can pass, a pressure drop is created across the inlet port 30b. Because the bypass port 30c remains blocked, this flow regime provides exhaust gas to the turbocharger only. That is to say, the only port through which exhaust gas exits the valve system 530 is through the outlet port 30a. This flow regime is therefore called "Back Pressure. Turbo only" because the exhaust gas flow only exits the valve system via the outlet port 30a, but the partial blocking of the inlet port 30b creates a pressure drop, or a "back pressure".

As the rotary valve 33 continues to rotate in a clockwise direction, the bypass port 30c remains blocked but the inlet port 30b becomes gradually more blocked by the rotary valve 33. Like that previously discussed for the "Back Pressure Turbo only" flow regime, a pressure drop is created across the inlet port 30b. As the inlet port 30b becomes more blocked the pressure drop increases and the rotary valve 33 moves towards completely blocking the inlet port 30b. That is to say, because the ease with which exhaust gas can pass the rotary valve 33 decreases, the pressure drop across the inlet port 30b increases. This build-up of pressure increases the pumping work which must be undertaken by the engine in order to force the exhaust gas from the engine manifold through the valve system 530. As such, the braking regime, intuitively, creates a braking effect on the engine. Eventually, the inlet 30b is entirely blocked by the rotary valve 33. At this rotational position, the maximum braking effect is realised.

With the rotary valve 33 continuing to rotate in a clockwise direction, a "Poor Control" flow regime is reached. In FIG. 16 the Poor Control regime is indicated with an international prohibition sign to represent the fact that this is an undesirable flow regime (as described in detail below). In this regime, the bypass port 30c is open and both the inlet and outlet ports 30b. 30a are somewhere between being mostly and entirely open. The poor control flow regime is so called because it is difficult to control what proportion of exhaust gas flow exits through the bypass port 30c, in comparison to that which exits through the outlet port 30a. Essentially, this lack of control means that the exhaust gas flowing through the valve system 530 is unpredictable when the rotary valve 33 is in this position. It is thus difficult to control whether the exhaust gas flows through the bypass port 30c or the outlet port 30a. This is problematic for reasons of not being able to direct exhaust gas flow to either an exhaust gas aftertreatment device downstream of the bypass port 30c, or to the turbocharger which is downstream of the outlet port 30a. The "Poor Control" flow regime is thus an undesirable flow regime.

As the rotary valve 33 continues to rotate in the clockwise direction, the outlet port 30a becomes gradually more blocked and is eventually completely blocked. Both the inlet port 30b and bypass port 30c remain open. When the outlet port 30a is completely blocked, this is the "100% Bypass" flow regime. As suggested by the name, in this regime no exhaust gas exits through the outlet port 30a and all of the exhaust gas exits through the bypass port 30c. This is particularly useful, as has been described elsewhere in this application, for initially increasing the temperature of an exhaust gas aftertreatment device upon vehicle start-up. All of the exhaust gas flow is therefore diverted through the bypass port 30c in the 100% Bypass regime, and substantially no exhaust gas flows through the outlet port 30a, upstream of the turbocharger.

As the rotary valve 33 continues to rotate in the clockwise direction, the outlet port 30a gradually opens. At this rotational position, a forced bypass flow regime begins whereby some, but not all, of the exhaust gas flow is urged through the bypass port 30c without entirely closing the outlet port 30a. In other words, the outlet port 30a is partially blocked and so flow is at least partially directed towards the bypass port 30c.

As the rotary valve 33 continues to rotate, a wastegate (WG) flow regime begins. In this regime, the inlet port 30b is completely open, and the outlet port 30a is mostly open. However, the bypass port 30c is gradually closed and therefore limits the amount of exhaust gas which passes through the bypass port 30c. In other words, as suggested by the name, this flow regime provides a similar functionality to that of a turbocharger wastegate. That is to say, exhaust gas is selectively diverted away from the outlet port 30a (upstream of the turbocharger turbine inlet) and is instead bypassed through the bypass port 30c. This allows the speed of the turbocharger to be controlled to suit the operating parameters at that time.

Further clockwise rotation of the rotary valve 33 from the wastegate flow regime returns the valve system 530 to the 100% turbocharger regime: the first flow regime discussed above.

An advantage of the acute angle of θ, between the inlet port 30b and the bypass port 30c, is that there are fewer "undesirable" flow regimes when compared to that of an obtuse angle arrangement (which will be described in detail below). In other words, for the acute angle arrangement, there is only one "Poor Control" flow regime in which the flow cannot be accurately controlled (i.e. the flow regime between the braking and 100% bypass regimes). There are a greater number of undesirable flow regimes in an obtuse arrangement. In addition, with an acute angle arrangement, more useful flow regimes can be reached without having to pass through a braking regime (contrary to an obtuse angle arrangement). For example, it is possible to move from the 100% turbocharger regime to the 100% bypass regime without passing through a braking regime.

It may also be possible to limit the rotation of the rotary valve 33 such that the poor control regime is eliminated altogether. That is to say, rather than having to pass through the poor control regime, rotating the rotary valve 33 in the opposite direction, through all of the other regimes, could essentially eliminate the poor control regime.

Also of note, from an aerodynamics perspective, the person skilled in the art would seek to provide the bypass port 30c at an obtuse angle relative to the inlet port 30b. This would be in order to reduce aerodynamic losses as the exhaust gas flow enters the valve system 530 and then passes through the bypass port 30c. As such, the acute angle arrangement is counter-intuitive because it would give rise to some losses from a fluid dynamics perspective. However, the applicant has found that the reduced number of "undesirable" flow regimes, and advantages provided thereby, outweigh the issues of aerodynamic losses in that better overall control of the exhaust gas is provided in the acute angle arrangement. This will become clearer when the flow regimes, and sequence of operation, of the "obtuse angle arrangement" is described in connection with FIG. 17 below.

Essentially, as alluded to above, the acute angle of θ allows all of the useful flow regimes to be obtained without having to pass through as many (or any) undesirable flow regimes.

Figure 17:
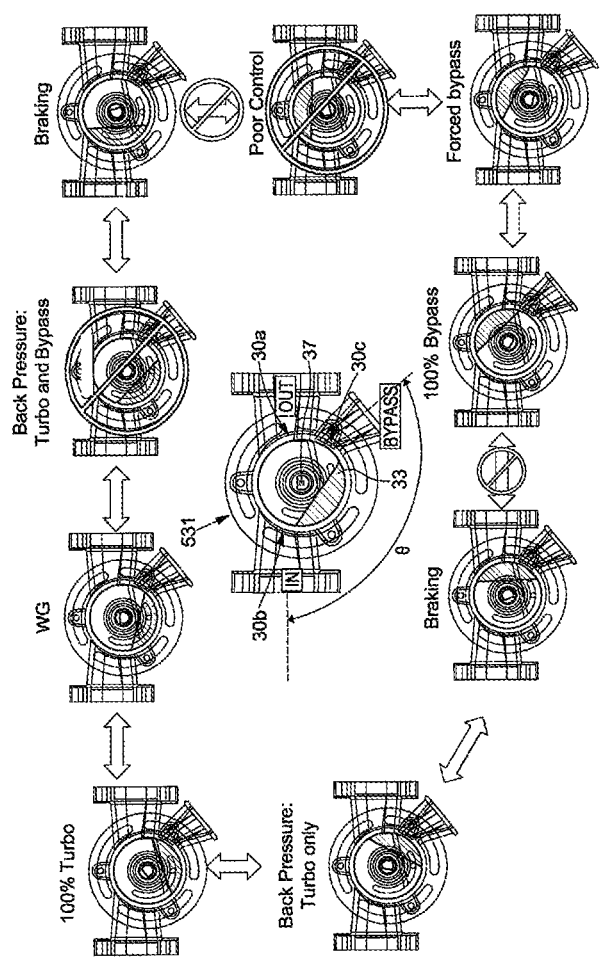
FIG. 17 shows schematic views of a valve system according to a prior art arrangement, as the rotary valve rotates through 360°, with corresponding flow regimes indicated thereon.

FIG. 17 illustrates an obtuse angle valve arrangement and associated flow regimes. It will be appreciated that, in this section and throughout this document, the valve arrangement may otherwise be referred to as a valve system. In other words, the angle θ between the inlet port 30b and bypass port 30c is greater than 90 degrees.

The obtuse angle valve arrangement 531 is illustrated centrally in FIG. 17. The angle θ between the inlet port 30b and bypass port 30c is greater than 90 degrees. Surrounding by the central valve arrangement are the modes of operation, and corresponding flow regimes caused by said operating modes, as the rotary valve 33 of the valve arrangement rotates through 360° about axis 37.

It is worth noting that, unlike for the arrangement shown in FIG. 16, in the arrangement of FIG. 17 as you move around the surrounding flow regimes in a clockwise direction, the rotary valve 33 (or valve member) also rotates in a clockwise direction.

Many of the operating regimes are shared between the acute and obtuse angle valve arrangements i.e. the sequence of operations shown in FIGS. 16 and 17. That is to say, some of the operating regimes are common to both valve systems 530, 531. However, and of note, the order of these regimes is different, owing to the acute or obtuse angle of the bypass port 30c relative to the inlet port 30b.

The wastegate, 100% turbocharger, back pressure turbo only, braking, poor control, 100% bypass, and forced bypass regimes are largely the same as for the acute angle arrangement in FIG. 16. As such, these will not be described in detail. Furthermore, the manner in which the acute angle and obtuse angle valve arrangements move between the wastegate and back pressure turbo only regimes via the 100% turbocharger regime is also equivalent (albeit with opposite directions of movement of the rotary valve 33 in FIGS. 16 and 17).

A different operating mode of the obtuse valve arrangement is that of the second braking regime shown between the back pressure turbocharger only and 100% bypass modes. In this braking regime the outlet port 30a and bypass port 30c are both blocked. As such, the inlet port 30b remains open, but no ports are open for the exhaust gas to flow out of the valve system 531. This creates back pressure and, as with the braking regime previously described in connection with FIG. 16, increases the pumping work of the engine, thereby leading to braking of the engine.

As the rotary valve 33 rotates in the anticlockwise direction from the aforementioned second braking mode, the 100% bypass regime begins. The transition between the second braking and 100% bypass modes is indicated with an international prohibition sign to show this is an undesirable transition. A problem with the obtuse angle arrangement is that when moving between the back pressure turbocharger only and 100% bypass modes, a braking regime (i.e. the second braking regime) must be passed through. That is to say, it may not always be desirable to pass through a braking regime when moving between the back pressure turbo only and 100% bypass modes. However, due to the obtuse angle arrangement, a braking regime (e.g. second braking regime) must be passed through. Even rotating the rotary valve 33 in the other direction. i.e. clockwise, will not avoid a braking regime, as will be discussed in greater detail below.

A further new regime is the back pressure: turbocharger and bypass operating regime. In this regime, the bypass port 30c and outlet port 30a are both open, and the inlet port 30b is at least partially blocked. As such, a pressure drop is created across the inlet port 30b due to the constriction of the flow. In this regime it is difficult to control via which of the outlet port 30a and bypass port 30c the exhaust gas exits the valve system 531. This therefore represents an undesirable flow regime and should be avoided where possible.

Like FIG. 16, a "poor control" regime (as shown on the far right in FIG. 17) occurs when the rotary valve 33 is in an uppermost position. In this position, bypass port 30c is open, with inlet port 30b and outlet port 30a being somewhere between completely, and mostly, open. As described in connection with FIG. 16, in this regime it is difficult to control where the exhaust gas, which enters via the inlet port 30b, exits the valve system 531.

A transition between the poor control flow regime and a braking regime in which the inlet port 30b is closed is marked as prohibited to indicate that it is an undesirable transition.

To summarise, the obtuse angle arrangement is undesirable for a number of reasons. These include the presence of two undesirable operating modes: the poor control operating mode, and the back pressure turbocharger and bypass mode. The arrangement is also undesirable because of having to pass through at least one braking regime to get to the 100% bypass regime from the 100% turbocharger regime, which are the most important flow regimes. This could lead to inefficiencies during operation of the valve system 531. In short, a bypass regime in an obtuse angle arrangement cannot be reached from many of the other flow regimes without first going through an undesirable flow regime.

The obtuse angle arrangement is the conventional valve arrangement from a fluid dynamics perspective. That is to say, the person skilled in the art would typically select an obtuse angle arrangement to reduce losses from exhaust gas entering via the inlet port 30b and exiting via the bypass port 30c. As such, the FIG. 17 arrangement and, in particular, the obtuse angle between inlet port 30b and bypass port 30c represents a conventional, yet, as explained, undesirable, layout of ports.

Figure 18:
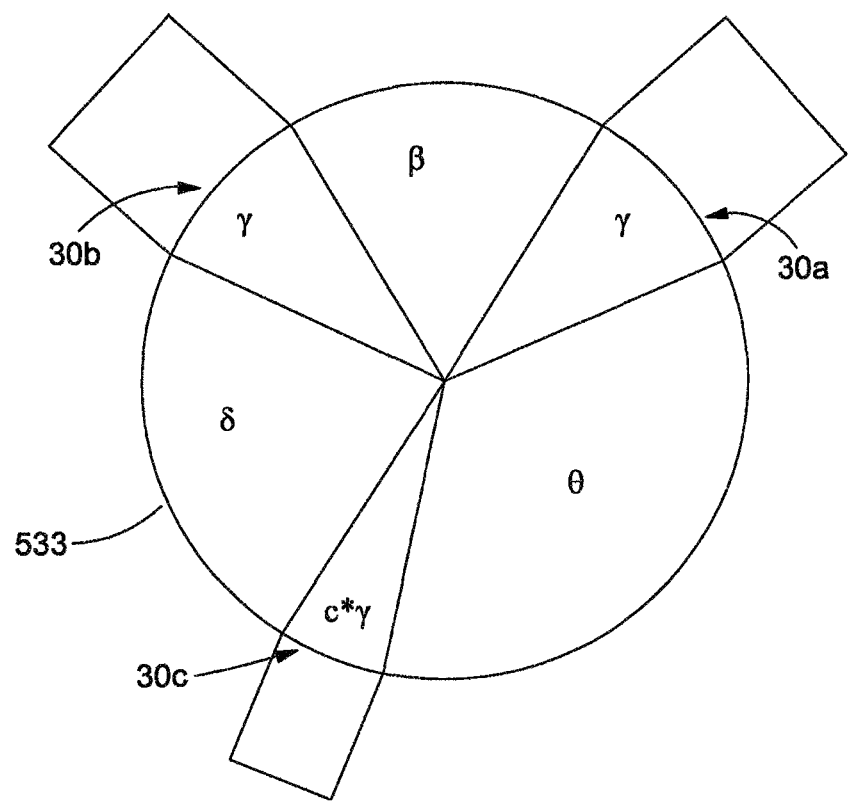
FIG. 18 shows a schematic view of a valve chamber according to an embodiment of the disclosure.

FIG. 18 is a schematic view of a valve chamber 533 according to an embodiment of the disclosure. Also labelled are inlet, outlet and bypass ports 30b, 30a. 30c respectively.

FIG. 18 is a parametric model used to select the valve chamber geometry. That is to say, FIG. 18, and the associated equations below, can be used to determine the positions of the ports relative to one another, as well as at least some of the geometry of the rotary valve.

The valve chamber 533 is divided into a number of sectors. These sectors are defined by the angle they subtend and are indicated with the following symbols, which are described briefly below:

θ is the sector which corresponds with the rotary valve;
γ is the sector corresponding with each of the inlet port 30b and outlet port 30a;
δ is the sector between the inlet and bypass ports 30b, 30c;
c is the ratio of the bypass port 30c sector relative to the inlet and outlet port 30b. 30a sectors, such that bypass sector (i.e. the angle subtended by the bypass port) is given by c multiplied by γ; and
β is the sector between the inlet port 30b and the outlet port 30a.

A number of equations, which relate the various aforementioned variables, will now be introduced.

As the valve chamber 533 is a complete circle, the sum of all of all of the sector values is equal to 360°.

Given the above, it follows that:

$$360 = 2\gamma + c\gamma + \beta + \delta + \theta \quad \text{(i)}$$

In other words, the sum of all the sectors is equal to 360°.

There is also a minimum sector size for the rotary valve. It is required that the bypass port 30c can be blocked at the same time as the inlet port 30b. This means that the braking flow regime can occur (i.e. both inlet and bypass ports 30b, 30c are blocked). This requirement gives rise to the following equation:

$$\text{Minimum rotary valve sector} = \gamma + \delta + c\gamma \qquad \text{(ii)}$$

It is also preferable to make the rotary valve as small as possible whilst still being able to utilise all of the flow regimes. Increasing the rotary valve size above this minimum leads to size, mass and cost penalties.

It is therefore preferable that the rotary valve sector is equal to the minimum required. Or, put in equation form:

$$\theta = \text{Minimum rotary valve sector} = \gamma + \delta + c\gamma \qquad \text{(iii)}$$

Substituting equation (iii) into equation (i):

$$360 = 2\gamma + c\gamma + \beta + \delta + \gamma + \delta + c\gamma = 3\gamma + 2c\gamma + \beta + 2\delta \qquad \text{(iv)}$$

Of the variables present in equation (iv) above: $\beta$ is determined by selecting the angular separation between the inlet and outlet ports 30b, 30a; and c is the ratio of inlet/outlet port 30b, 30a sectors to the bypass port 30c sector.

If the variables $\beta$ and c are known, $\gamma$ can be adjusted to increase $\delta$ using the following equation (based upon equation (iv) having been rearranged to make $\delta$ the subject):

$$\delta = \frac{360 - 3\gamma - 2c\gamma - \beta}{2} \qquad \text{(v)}$$

If a known value of $\delta$ is required to optimise sealing parameters (i.e. a minimum distance between the inlet and bypass ports 30b, 30c), equation (v) can be rearranged to determine $\gamma$:

$$\gamma = \frac{360 - 2\delta - \beta}{3 + 2c} \qquad \text{(vi)}$$

With all of the variables known, all that is required is to select an arc length of one of the sectors. The arc length is equal to the product of the radius and the sector size (or angle) when the sector size or angle is provided in radians. Using the equation below, the radius, and so diameter, of the valve can therefore be determined (arc length=l, r=radius and $\alpha$=sector angle [in radians]):

$$l = r\alpha \qquad \text{(vii)}$$

Therefore valve diameter equals twice the arc length of a particular sector divided by the sector size (or angle) of the particular sector. Once the diameter (and hence radius) of the valve is known, equation (vii) above relates the sector size (or angle) to the arc length.

The parametric model and above equations therefore allow the geometry of the valve chamber and rotary valve to be determined.

Figure 13:
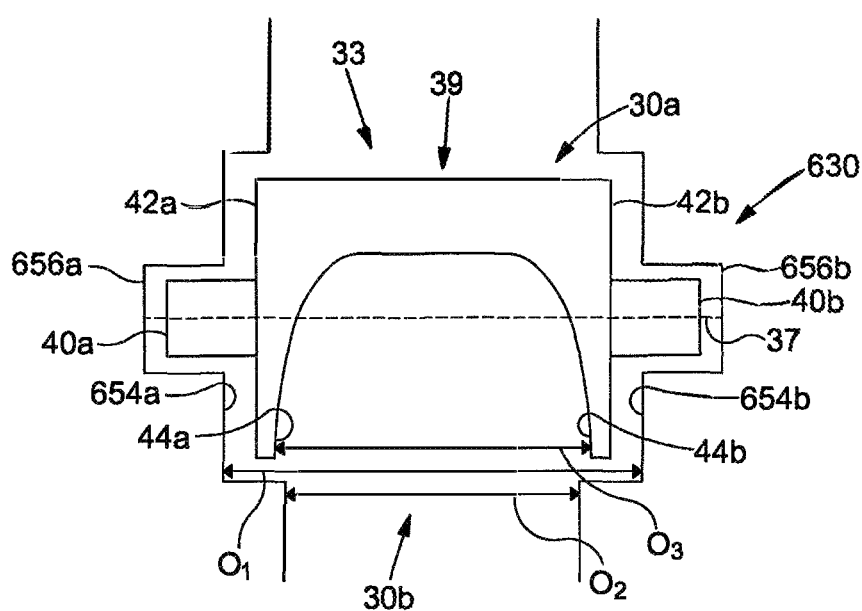
FIG. 13 shows a schematic view of a valve system according to an embodiment of the fifth aspect of the present disclosure.

FIG. 13 shows a schematic view of an embodiment of a valve system 630 according to a fifth aspect of the present disclosure.

In this embodiment, the rotary valve 34 is the same as that described in relation to FIG. 3. However, valve chamber 631 is modified such that endwalls of the valve chamber 631 are recessed.

FIG. 13 shows the valve system 630 in a plan view; hence the bypass port 30c is omitted from the figure.

The valve chamber 631 comprises axially recessed endwalls 654a, 654b. Axially recessed endwalls 654a, 654b are recessed relative to the inlet port 30b. Axially recessed endwalls 654a, 654b are axially offset from one another by an axial distance $O_1$. Inlet port 30b is an opening with an axial dimension of $O_2$.

Endwalls 42a, 42b of valve rotor 39 are received by the axially recessed endwalls 654a, 654b of the valve chamber 631. This is advantageous for reasons of reduced leakage of exhaust gas between respective endwalls in use.

Valve chamber 631 further comprises spindle-receiving recesses 656a, 656b which receive spindles 40a, 40b of rotary valve 33.

In the illustrated embodiment, the endwalls 654a, 654b are recessed such that when viewed normal to the direction of the incoming exhaust gas flow through the inlet port 30b, corners of internal walls 44a, 44b of the valve rotor are not visible. In other words, as illustrated in FIG. 13, axial dimension $O_3$ is less than $O_2$. However, this is an optional feature of the disclosure.

Figure 14:
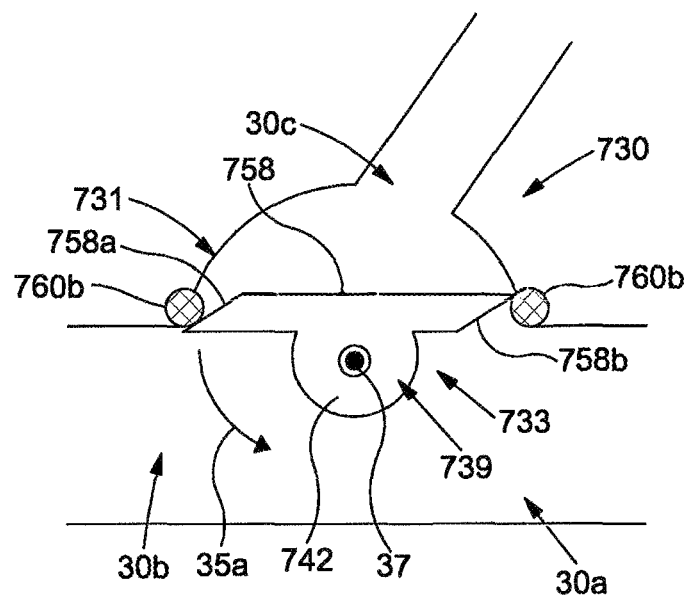
FIGS. 14 and 15 show schematic views of two valve rotor positions of an embodiment of a valve system according to a sixth aspect of the present disclosure.
Figure 15:
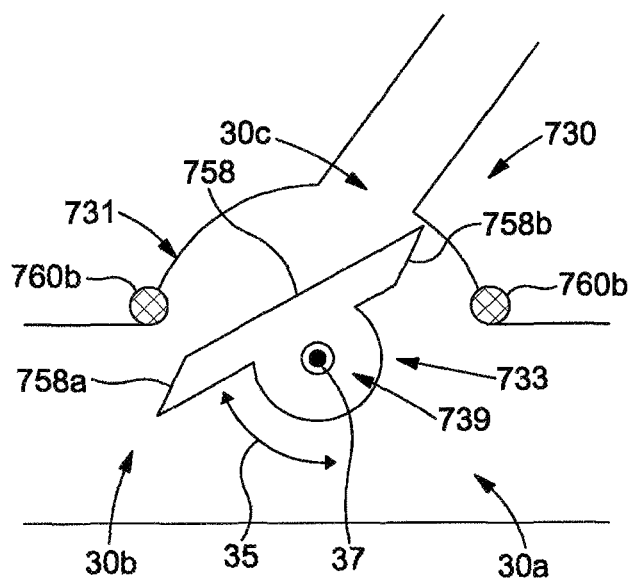

FIGS. 14 and 15 show schematic views of two valve rotor positions of an embodiment of a valve system 730 according to a sixth aspect of the present disclosure. Both rotary valve 733 and valve chamber 731 differ from the embodiments previously illustrated and described. However, the operation of the valve system 730 is somewhat similar to the embodiment illustrated in FIGS. 7 and 8.

The rotary valve 733 comprises a valve rotor 739 which rotates about valve axis 37. The valve rotor 739 comprises a plurality of axially offset endwalls 742 (only one of which is visible in FIG. 14). A sealing plate 758 is disposed between the endwalls 742. Flat end surfaces 758a, 758b of sealing plate 758 abut or contact rods 760a, 760b disposed in the valve chamber 731 to create a seal, depending on the rotational position of the rotary valve 733.

Valve chamber 731 comprises inlet port 30b, outlet port 30a and bypass port 30c. However, in the illustrated embodiment the valve chamber 731 further comprises rods 760a, 760b. Rods 760a, 760b may be generally cylindrical bodies which are positioned in the valve chamber 731. Alternatively, the rods 760a, 760b may be features integrally formed in the valve chamber which provide a curved surface which the flat end surfaces 758a, 758b of the sealing plate can contact. Furthermore, although the illustrated embodiment shows two rods 760a, 760b, only one of these rods is necessary for the disclosure.

In FIG. 14 the rotary valve 733 is shown in a bypass port blocking position such that exhaust gas is substantially prevented from flowing through bypass port 30c. As mentioned above, the seal is created by the 2 interaction between flat end surfaces 758a, 758b and rods 760a, 760b. The cooperation between the end surfaces 758a, 758b and rods 760a, 760b also provides a backstop for the rotary valve 733. This is useful because, when the rotary valve 733 is in the bypass port blocking position, the end surfaces 758a, 758b and rods 760a, 760b assist in locating the rotary valve 733 to increase the effectiveness of the seal.

The incorporation of the rods 760a, 760b is also advantageous because the rotational tolerance of the rotation of the rotary valve 733 can be relaxed as a result. That is to say, more "play" in the rotation of the rotary valve 733 is acceptable because the rods 760a, 760b assist in forming a more effective seal. Specifically, manufacturing tolerances for the dimensions of spindles of the rotary valve 733 can be relaxed (i.e. reduced or made less precise). Manufacturing tolerances for the rotary valve 733 in general can be relaxed. Furthermore, the tolerance required of bushes into which the spindles are received is also reduced.

In FIG. 14, the direction of rotational travel possible for the rotary valve 733 is indicated by arrow 35a.

FIG. 15 shows the rotary valve 733 in a position other than the bypass port blocking position of FIG. 14. In the rotational position depicted in FIG. 15, exhaust gas flow is able to flow via the bypass port 30c. This is because there is no contact between the end surfaces 758a, 758b and rods 760a, 760b. No seal is therefore formed. The directions of rotational travel possible for the rotary valve 733 in FIG. 15 are indicated by arrow 35.

In all of the described embodiments, an actuator may be used to rotate the rotary valve.

References to rotation of the valve rotor may interchangeably refer to rotation of the rotary valve, of which the valve rotor is a constituent part. Furthermore, references to the valve rotor blocking or permitting flow may equally apply to the rotary valve permitting or blocking flow.

The described and illustrated embodiments are to be considered as illustrative and not restrictive in character, it being understood that only preferred embodiments have been shown and described and that all changes and modifications that fall within the scope of the disclosures as defined in the claims are desired to be protected.

In relation to the claims, it is intended that when words such as "a," "an," "at least one," or "at least one portion" are used to preface a feature there is no intention to limit the claim to only one such feature unless specifically stated to the contrary in the claim.

Optional and/or preferred features as set out herein may be used either individually or in combination with each other where appropriate and particularly in the combinations as set out in the accompanying claims. The optional and/or preferred features for each aspect of the disclosure set out herein are also applicable to any other aspects of the disclosure, where appropriate.

The invention claimed is:

1. A valve system for an engine arrangement, the valve system comprising:
    a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device;
    a rotary valve comprising a valve rotor which rotates about a valve axis within the valve chamber;
    wherein the valve rotor is rotatable about the valve axis between a first position in which the valve rotor permits gas flow through the bypass port and a second position in which the valve rotor blocks gas flow through the bypass port; and
    wherein the bypass port is generally trapezoidal and has a major dimension in the axial direction.

2. The valve system of claim 1, wherein an aspect ratio of the bypass port is between around 5:1 and around 20:1.

3. The valve system of claim 1, wherein a cross-sectional area of the bypass port is smaller than a cross-sectional area of the inlet port.

4. The valve system of claim 3, wherein a ratio of the cross-sectional area of the bypass port to the cross-sectional area of the inlet port is between around 1:1.2 and 1:20.

5. The valve system of claim 4, wherein the ratio is between around 1:1.2 and 1:10.

6. The valve system of claim 1, wherein the bypass port is positioned relative to the inlet port such that an angle between the inlet port and the bypass port is acute.

7. The valve system of claim 6, wherein the angle between the inlet port and the bypass port is between around 5° and 80°.

8. The valve system of claim 7, wherein the angle between the inlet port and the bypass port is around 25°.

9. The valve system of claim 1, the valve rotor having axially offset endwalls and opposing internal walls;
    wherein the valve chamber comprises axially recessed endwalls relative to the inlet port, the valve rotor endwalls being received by the recessed endwalls of the valve chamber to reduce leakage between the respective endwalls in use.

10. The valve system of claim 1, wherein the valve system is configured such that the valve system exhibits the following flow regimes in order as the valve rotor rotates from a position in which the outlet port is substantially blocked:
    (i) a 100% bypass regime in which the outlet port is substantially blocked by the valve rotor;
    (ii) a forced bypass regime in which the bypass port is open and the outlet port is at least partially open;
    (iii) a wastegate regime in which the outlet port is open and the bypass port is at least partially open;
    (iv) a 100% turbocharger regime in which the bypass port is substantially blocked and the inlet and outlet ports are open;
    (v) a back pressure turbocharger only regime in which the bypass port is substantially blocked and the inlet port is at least partially blocked;
    (vi) a braking regime in which the inlet port is substantially blocked; and
    (vii) a poor control regime in which the bypass port is open, and the inlet and outlet ports are at least partially open.

11. The valve system of claim 1, wherein the valve system is configured such that an angle $\gamma$ subtended about the valve axis by each of the inlet port and outlet port is given by:

$$\gamma = 360 - 2\delta - \beta/3 + 2c$$

where $\delta$ is an angle subtended about the valve axis between the inlet and bypass ports; c is a ratio of an angle subtended about the valve axis by the bypass port relative to the angle subtended about the valve axis by each of the inlet port and outlet port, such that an angle subtended about the valve axis by the bypass port is given by c multiplied by $\gamma$; and $\beta$ is an angle subtended about the valve axis between the inlet port and the outlet port.

* * * * *